United States Patent
Kita et al.

(10) Patent No.: US 8,719,364 B2
(45) Date of Patent: May 6, 2014

(54) SYSTEM, METHOD AND PROGRAM FOR NETWORK MANAGEMENT USING SAVED HISTORY INFORMATION

(75) Inventors: Shinsaku Kita, Saitama-ken (JP); Ken Sakakibara, Tokyo (JP)

(73) Assignee: Canon Denshi Kabushiki Kaisha, Chichibu-Shi, Saitama-Ken (JP)

( * ) Notice: Subject to any disclaimer, the term of this patent is extended or adjusted under 35 U.S.C. 154(b) by 1117 days.

(21) Appl. No.: 12/056,413

(22) Filed: Mar. 27, 2008

(65) Prior Publication Data
US 2008/0244070 A1    Oct. 2, 2008

(30) Foreign Application Priority Data
Mar. 30, 2007  (JP) ................. 2007-093316

(51) Int. Cl.
*H04L 29/06* (2006.01)
(52) U.S. Cl.
USPC ........... 709/217; 709/218; 709/219; 709/223; 709/227; 709/230; 709/238; 709/245; 709/246
(58) Field of Classification Search
USPC ......... 709/217, 218, 219, 223, 227, 230, 238, 709/245, 246
See application file for complete search history.

(56) References Cited

U.S. PATENT DOCUMENTS

| | | | |
|---|---|---|---|
| 7,603,408 B1* | 10/2009 | McGinnis et al. | 709/203 |
| 2005/0188036 A1* | 8/2005 | Yasuda | 709/206 |
| 2006/0075027 A1* | 4/2006 | Zager et al. | 709/206 |
| 2006/0184632 A1* | 8/2006 | Marino et al. | 709/206 |
| 2006/0212522 A1* | 9/2006 | Walter et al. | 709/206 |
| 2008/0177843 A1* | 7/2008 | Gillum et al. | 709/206 |

FOREIGN PATENT DOCUMENTS

| | | | |
|---|---|---|---|
| JP | 2003-229911 A | 8/2003 | |
| JP | 2003-249964 A | 9/2003 | |
| JP | 2003-333100 | 11/2003 | ............. H04L 12/58 |
| JP | 2003-348166 | 12/2003 | ............. H04L 12/58 |
| JP | 2004-112499 A | 4/2004 | |
| JP | 2005-208780 A | 8/2005 | |
| JP | 2005-258855 A | 9/2005 | |
| JP | 2005-267015 | 9/2005 | |
| JP | 2006-330791 A | 12/2006 | |

OTHER PUBLICATIONS

F. Ikeda, "Thorough introduction of forward-looking, cutting-edge technology," Network World, IDG Japan Corporation, Aug. 1, 2006, vol. 11, No. 8, pp. 40-41 (English translation).

(Continued)

*Primary Examiner* — Kenny Lin
*Assistant Examiner* — Abdelnabi Musa
(74) *Attorney, Agent, or Firm* — Fitzpatrick, Cella, Harper & Scinto

(57) ABSTRACT

A network management system transmits/receives an email via a network; saves, in a database, first history information including the address of at least one of the destination and the source of the email written in the email; receives transmission information in which access information for accessing a web page via a network is written; saves, in the database, second history information including the access information written in the transmission information; inputs authentication information for identifying a user; and selectively displays the first history information saved in the first saving unit and the second history information saved in the second saving unit in a predetermined display format on a display unit by switching between the first history information and the second history information based on an instruction inputted by a user when the inputted authentication information is identical to previously registered information.

17 Claims, 26 Drawing Sheets

(56) References Cited

OTHER PUBLICATIONS

"Points on constructing appropriate information security," Network World, IDG Japan Corporation, Sep. 1, 2006, vol. 11, No. 9, pp. 10-13 (partial English translation).

Masanori Hare, et al., "Adaptive Website Filtering Based on Spam Mails," Proceedings of the 2006 IEICE General Conference, The Institute of Electronics, Communication 2, Information and Communication Engineers, Mar. 8, 2006, p. 136 (English translation included).

* cited by examiner

FIG. 15

| NOTIFICATION EMAIL |
|---|
| - THIS NOTIFICATION EMAIL IS TO INFORM YOU OF A LIST OF SPAM/VIRUS-INFECTED EMAILS STORED IN THE FILTER CENTER (QUARANTINE).<br>- THE LIST INFORMS YOU OF UP TO 100 SPAM/VIRUS-INFECTED EMAILS STORED IN THE FILTER CENTER (QUARANTINE).<br>- PLEASE LOG INTO THE FILTER CENTER IF YOU WISH TO CHECK THESE EMAILS. |
| \* FILTER CENTER URL<br>http://watcher.XXX.co.jp<br>Display format : (TYPE, SENDER, SUBJECT, REASON FOR BLOCKING, RECEIVED TIME, SIZE)<br>TOTAL NUMBER OF SPAM/VIRUS-INFECTED EMAILS STORED IN THE FILTER CENTER (QUARANTINE): 4/RECEIVED DATE: 2006-10-16 01:00 |

| TYPE | SENDER | SUBJECT |
|---|---|---|
| REASON FOR BLOCKING | RECEIVED TIME | SIZE |
| spam | info@abc.info | RECOMMENDATION FROM... |
| PATTERN : BlackURL | 2006/10/17 00:04 | 2K |
| spam | lajkuxxxxxxxpa@xxxx.ca | IT'S ALREADY OCTOBER, HOW HAVE YOU BEEN? |
| PATTERN : Product : www.xxxxxdoxxxxxxxx.cx | 2006/10/16 07:17 | 3K |
| spam | info@small.xxxxx11.xxx | WOULD YOU LIKE TO...? |
| PATTERN : BlackURL | 2006/10/16 04:06 | 2K |
| spam | info@xxxngxxxxx.info | HOT... |
| PATTERN : BlackURL | 2006/10/16 02:10 | 2K |

FIG. 16

| | CLASSIFI-CATION | SENDER | SUBJECT | DATE | SIZE | REASON FOR ACTION | REPORT NORMAL EMAIL |
|---|---|---|---|---|---|---|---|
| □ | □☒ | ENDOHxxxx | TOO MANY UNNECESSARY... | 2006/10/19 03:52 | 4.47K | PATTERN FILTER : Txxx_B... | 1301 |
| □ | □☒ | Jangle Snnn | Jangle Snnn xxxxxx | 2006/10/18 18:56 | 1.87K | PATTERN FILTER : Sxxx_B... | |
| □ | □☒ | Info@1xxx... | FIND YOUR SECOND LIFE! | 2006/10/17 18:09 | 1.63K | PATTERN FILTER : Txxx_B... | |
| □ | □☒ | Info@gxxx... | COMMUNITY'S xxxx | 2006/10/17 12:26 | 1.7K | PATTERN FILTER : Txxx_B... | |
| □ | □☒ | Info@1gxx... | RECOMMENDATION FROM xx | 2006/10/17 00:04 | 2.5K | PATTERN FILTER : Txxx_B... | |
| □ | □☒ | KOIKE | IT'S ALREADY OCTOBER, HOW HAVE YOU BEEN? | 2006/10/16 07:17 | 3.92K | PATTERN FILTER : Pxxx_B... | |
| □ | □☒ | Info@sssss... | WOULD YOU LIKE TO ADJUST...? | 2006/10/16 04:05 | 2.17K | PATTERN FILTER : Txxx_B... | |
| □ | □☒ | Info@sxxx... | HOT xxxxx | 2006/10/16 02:10 | 2.77K | PATTERN FILTER : Txxx_B... | |
| □ | □☒ | Octxxx Mx... | everyday xxxx | 2006/10/12 19:50 | 1.94K | RPD | |
| □ | □☒ | Spxxxxx B... | expandxxx xxxx | 2006/10/10 06:22 | 21.35K | RPD | |
| □ | □☒ | tatsukoXX... | XXX III xxx | 2006/10/07 11:06 | 1.28K | PATTERN FILTER : Txxx_B... | |
| □ | □☒ | Mr.xxxxxxx | NO SUBJECT | 2006/10/07 04:36 | 4.7K | LEARNING FILTER | |
| □ | □☒ | taroo@boo... | TOO MANY UNNECESSARY... | 2006/10/06 16:08 | 2.37K | PATTERN FILTER : Txxx_B... | |
| □ | □☒ | RITSUKO | YESTERDAY xx ADDRESS xx, THE ADDRESS | 2006/10/06 04:39 | 1.79K | LEARNING FILTER | |
| □ | □☒ | Info@1xxx... | Re : | 2006/10/05 02:06 | 3.06K | PATTERN FILTER : Pxxx_B... | |

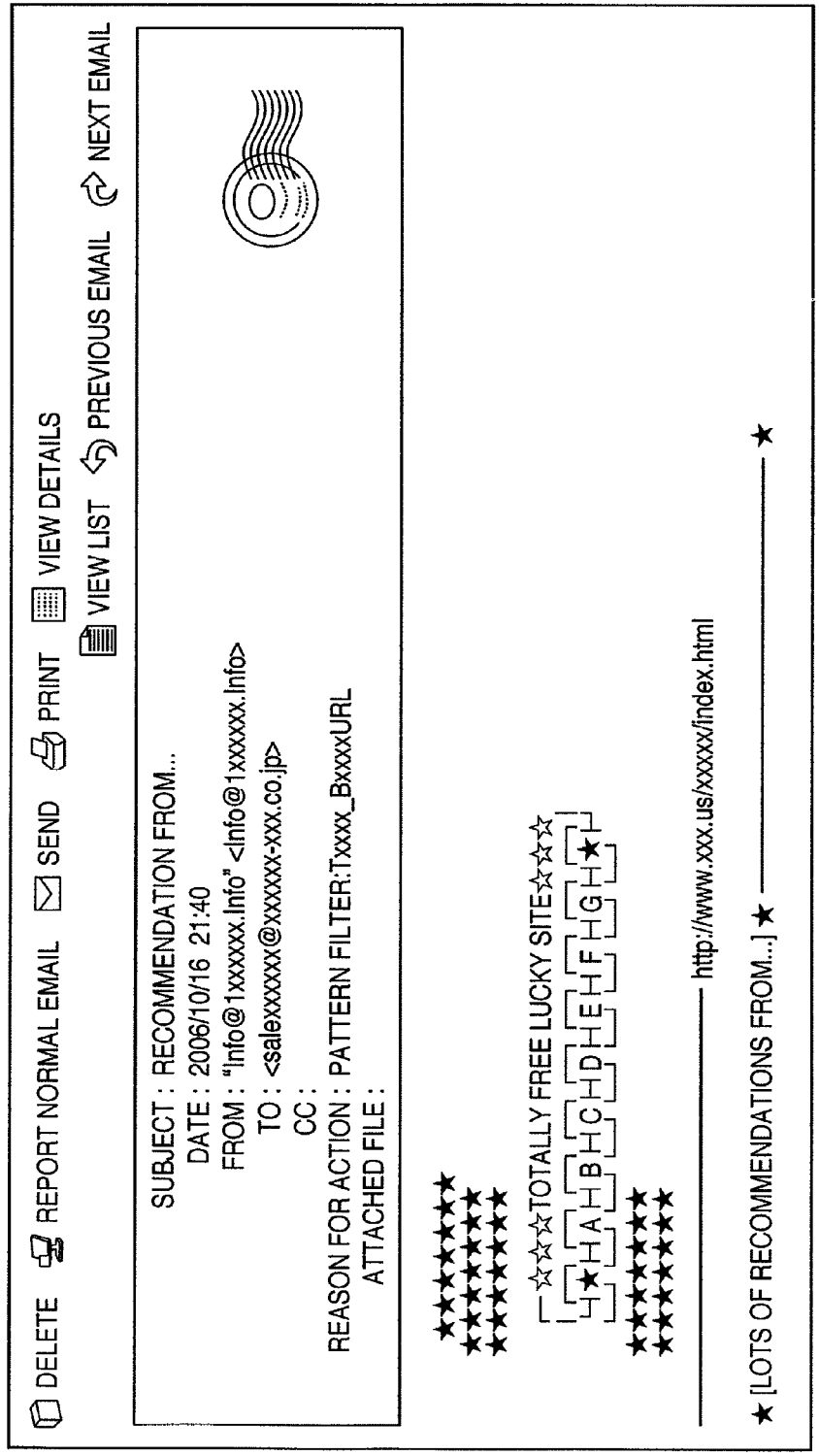

F I G. 18

1. THIS EMAIL PROVIDES YOU WITH ONLY SUPER POPULAR AND EXCELLENT SITES FROM MANY XXXXX SITES!
2. THIS TIME OFFERS TOTALLY FREE SUPER XXX SITES FOR BOTH MEN AND WOMEN!!

EVERYTHING STARTS FROM HERE. → http://XXXXX.com/
3. IF YOU WANT TO FIND ...SERIOUSLY, EVERYTHING STARTS FROM HERE. → http://YYYYY.com/

★

IF YOU DO NOT WISH TO RECEIVE EMAIL FROM US, SEND AN EMAIL TO
abc@xyz.pgr
[1016][EX1]

DELETE　REPORT NORMAL EMAIL　SEND　PRINT　VIEW DETAILS

FIG. 20

WEB ACCESS MONITORING IS USED TO MONITOR HISTORY OF WEB PAGE VIEWING VIA A WEB BROWSER.

- Webaccess

☐ ☐ SUBJECT ☐ CORRECTLY ☐ 🔍 ☐ DETAILED SEARCH

| ☐ | TIME ▶ | Client host (IP) | URL (referer HREF) |
| --- | --- | --- | --- |
| | | Server host (IP) | |
| ☐ | 09/14 09:29:41 | xxxxxxx.xxxx.xxxxxxxxx.co.jp | http://xxx.xxx.xxx.xxxxxx.co.jp/xx/xxxxxxxxx-xx... |
| | | xxxxxxx.co.jp | |
| ☐ | 09/14 09:29:41 | xxxxxxx.xxxx.xxxxxxxxx.co.jp | http://xxx.xxx.xxx.xxxxxx.co.jp/xx/xxxxxxxxx-xx... |
| | | xxxxxxx.co.jp | http://xxx.xxx.xxx.xxxxxx.co.jp/xx/xxxxxxxxx-xx... |
| ☐ | 09/14 09:29:45 | xxxxxxx.xxxx.xxxxxxxxx.co.jp | http://xxx.xxx.xxx.xxxxxx.co.jp/xx/xxxxxxxxx-xx... |
| | | xxxxxxx.co.jp | http://xxx.xxx.xxx.xxxxxx.co.jp/xx/xxxxxxxxx-xx... |
| ☐ | 09/14 09:29:45 | xxxxxxx.xxxx.xxxxxxxxx.co.jp | http://xxx.xxx.xxx.xxxxxx.co.jp/xx/xxxxxxxxx-xx... |
| | | xxxxxxx.co.jp | |
| ☐ | 09/14 09:29:45 | xxxxxxx.xxxx.xxxxxxxxx.co.jp | http://xxx.xxx.xxx.xxxxxx.co.jp/xx/xxxxxxxxx-xx... |
| | | xxxxxxx.co.jp | |

☐ MONITORING
☐ INFORMATION PROTECTION FILTER
☐ PROTECTED ITEMS
☐ WEB-BASED EMAIL MONITORING
☐ WEB ACCESS MONITORING

FIG. 21

| | 2101 | 2102 | 2103 | 2104 | 2105 | |
|---|---|---|---|---|---|---|
| 2115 | ALL EMAILS | NORMAL EMAILS | SPAMS | PHISHING EMAILS | VIRUS-INFECTED EMAILS | |

□ MONITORING

□ EMAIL LOG

□ SYSTEM STATUS

□ TRANSMISSION/ RECEPTION VIEW

□ WORK LOG

2116

□ WEB-BASED EMAIL MONITORING

□ WEB ACCESS MONITORING

2117

□ SUBJECT [ ]  □ CORRECTLY [ ]  🔍 □ DETAILED SEARCH

| | 2111 | 2112 | 2113 | 2114 |
|---|---|---|---|---|
| 2110 TIME ▼ | SENDER RECIPIENT | SUBJECT | ACTION TAKEN REASON | REPORT NORMAL /SPAM |
| 10/25 14:05 219.127.116.164 | xxx@xxxx... xxx@xxxx... | [XXXXX] IrSimple AUTHENTICATION | TRANSMISSION COMPLETED | REPORT SPAM |
| 10/25 14:04 87.245.169.250 | NONE | NO MESSAGE | reject EHLO DNS TEST: helo_dom... | |
| 10/26 14:04 80.178.206.91 | NONE | NO MESSAGE | reject EHLO DNS TEST: helo_dom... | |
| 10/25 14:04 220.140.113.93 | NONE | NO MESSAGE | reject EHLO DNS TEST: helo_dom... | |

|1|2|3|4|5|6|7|8|9|10| ◂ ▸ ▸|    RESULT 1-16

FIG. 22

WEB-BASED EMAIL MONITORING IS USED TO MONITOR EMAIL TRANSMITTED VIA A WEB BROWSER.

· Webmail

| ☐ | SUBJECT | | CORRECTLY | | | ☐ DETAILED SEARCH |
|---|---|---|---|---|---|---|
| | 2201 | | 2202 | | | 2203 |
| ☐ | TIME ▼ | | SENDER | | | SUBJECT |
| | | | RECIPIENT | | | |
| ☐ | 09/14 14:14:30 | | xxxxxxx.co.jp | | | secret mail from XxxxxELEC |
| | 172.19.156.157 | | xxxxxxxxxxxxxxxxxxxx.co.jp | | | |
| ☐ | 09/14 14:15:38 | | xxxxxxx.co.jp | | | secret mail from XxxxxELEC |
| | 172.19.156.157 | | xxxxxxxxxxxxxxxxxxxx.co.jp | | | |
| ☐ | 09/14 14:15:38 | | xxxxxxx.co.jp | | | secret mail from XxxxxELEC |
| | 172.19.156.157 | | xxxxxxxxxxxxxxxxxxxx.co.jp | | | |
| ☐ | 09/14 14:15:38 | | xxxxxxx.co.jp | | | secret mail from XxxxxELEC |
| | 172.19.156.157 | | xxxxxxxxxxxxxxxxxxxx.co.jp | | | |
| ☐ | 09/14 14:16:42 | | xxxxxxx.co.jp | | | |
| | 172.19.156.157 | | xxxxxxxxxxxxxxxxxxxx.co.jp | | | |

2204

⊟ MONITORING

INFORMATION
⊟ PROTECTION FILTER

⊟ PROTECTED ITEMS

2205

⊟ WEB-BASED EMAIL MONITORING

⊟ WEB ACCESS MONITORING

WEB ACCESS SETTINGS ALLOW SETTINGS FOR WEB-BASED EMAIL MONITORING AND NOTIFICATION EMAIL.

MONITORING SETTINGS

| MONITORING ON/OFF | ○ ON    ○ OFF |
|---|---|
| MONITORING PORT | HTTP SERVICE PORT : 0<br>HTTPS (SSL) SERVICE PORT : 0 |
| PROCESS INTERVAL | 7 MIN. |

EMAIL TRANSMISSION TEST

NOTIFICATION EMAIL SETTINGS

| SENDER | EMAIL ADDRESS |
|---|---|
| RECIPIENT | |

SYSTEM, METHOD AND PROGRAM FOR NETWORK MANAGEMENT USING SAVED HISTORY INFORMATION

BACKGROUND OF THE INVENTION

1. Field of the Invention

The present invention relates to a system, method and program for network management, in particular to controlling access to web pages and email transmission/reception.

2. Description of the Related Art

TCP/IP (Transmission Control Protocol/Internet Protocol), which is a WWW (World Wide Web) communication protocol, is widely used to transmit and receive information over the Internet. When transmitting/receiving web data, HTTP (Hyper Text Transfer Protocol), which is defined as an upper layer of TCP/IP, is used. A client who receives service from a WWW server system inputs a URL (Uniform Resource Locator) into a WWW browser to access the web page (website) specified by the URL.

Access to web pages is usually unrestricted, so that users can browse various information published on web pages all over the world through the Internet. Accordingly, web pages are utilized not only in ordinary households, but also in educational institutions and business sectors. However, while the Internet is useful for obtaining information, its very capability of allowing users to browse information in an unlimited manner has its downsides as well. Examples of the downsides that have been pointed out include a difficulty in finding desired information from among the high amount of information that is available, access to harmful information by children and juveniles, and so on.

To this end, a technique has been developed for providing an appropriate restriction on web page browsing (Japanese Patent Laid-Open No. 2005-267015). This technique prevents users from browsing specific web pages by regulating access to the web pages based on registration information including the URLs of banned sites and those of approved sites, which have been registered in advance. This type of web page browsing restriction method is generally called "URL filtering".

Meanwhile, email systems are known as another way to transmit/receive information over the Internet. The email system is a system that allows the exchange of data and messages with specific users through the Internet. The email system is used in various situations because it can be used with any terminal as long as the terminal can connect to the Internet.

However, it is known that the email system also has a downside associated with its convenience. For example, what is called spam (unsolicited email), which refers to email sent in bulk to recipients without their permission for the purpose of advertisement, promotion, solicitation and the like, has recently become a social problem. In light of such circumstances, a technique for blocking email addressed to unspecified recipients has been developed (Japanese Patent Laid-Open No. 2003-348166). This technique allows a server that transmits/receives email to/from a communication device to control the delivery of a received email to the recipient specified by the email based on whether or not the received email satisfies predetermined conditions. Another configuration is known in which emails transmitted/received in a network are classified so as to manage the email utilization status (Japanese Patent Laid-Open No. 2003-333100).

In order to restrict web browsing, quarantine a received email, or manage emails with the conventional techniques as described above, it is necessary to prepare a dedicated device for executing each process, such as a device for detecting who viewed what in order to restrict web browsing, and a device for viewing an email log in order to quarantine a received email. This increases the size of the system and requires a large installation space. Further, because security is essential for both devices, the administrator has to operate each device using an ID and a password, and perform an authentication operation on each device, which makes controlling and operating the device complicated.

SUMMARY OF THE INVENTION

The present invention has been conceived in view of the problems described above, and it is an object of the present invention to provide a technique that allows an easy operation for controlling web browsing and email transmission/reception.

Another object of the present invention is to provide a technique that can collectively perform website access management and management of email transmission/reception.

Another object of the present invention is to provide a technique by which the history of access to inappropriate sites and the history of receiving spams can be easily monitored.

Further, another object of the present invention to provide a technique that can suppress access to inappropriate sites and email transmission to spam senders to the highest degree possible.

According to one aspect of the present invention, a network management system comprises:

a transmitting/receiving unit adapted to transmit/receive an email via a network;

a first saving unit adapted to save, in a database, first history information including the address of at least one of the destination and the source of the email written in the email;

a receiving unit adapted to receive transmission information in which access information for accessing a web page via a network is written;

a second saving unit adapted to save, in the database, second history information including the access information written in the transmission information;

an input unit adapted to input authentication information for identifying a user; and a display control unit adapted to selectively display the first history information saved in the first saving unit and the second history information saved in the second saving unit in a predetermined display format on a display unit by switching between the first history information and the second history information based on an instruction inputted by a user when the inputted authentication information is identical to previously registered information.

According to another aspect of the present invention, a network management system comprises:

a receiving unit adapted to receive an email sent via a network;

a saving unit adapted to save, in a database, history information including access information for accessing a web page that is written in body of the email or in a document file attached to the email;

an input unit adapted to input authentication information for identifying a user; and a display control unit adapted to display the saved history information on a display unit when the inputted authentication information is identical to previously registered information.

According to still another aspect of the present invention, a network management system comprises:

a receiving unit adapted to receive an email sent via a network;

a first determining unit adapted to determine whether or not the received email is an unsolicited email;

an extracting unit adapted to extract access information for accessing a web page and/or email address information that are written in body of the email or in a document file attached to the email when the first determining unit determines the email to be an unsolicited email; and a saving unit adapted to save, in a database, the access information and/or the address information extracted by the extracting unit.

According to yet another aspect of the present invention, a network management method in a network management system comprises:

a transmitting/receiving step of transmitting/receiving an email via a network;

a first saving step of saving, in a database, first history information including the address of at least one of the destination and the source of the email written in the email;

a receiving step of receiving transmission information in which access information for accessing a web page via a network is written;

a second saving step of saving, in the database, second history information including the access information written in the transmission information;

an input step of inputting authentication information for identifying a user; and a display control step of selectively displaying the first history information saved in the first saving step and the second history information saved in the second saving step in a predetermined display format on a display unit by switching between the first history information and the second history information based on an instruction inputted by a user when the inputted authentication information is identical to previously registered information.

According to still yet another aspect of the present invention, a network management method in a network management system comprises:

a receiving step of receiving an email sent via a network;

a saving step of saving, in a database, history information including access information for accessing a web page that is written in body of the email or in a document file attached to the email;

an input step of inputting authentication information for identifying a user; and a display control step of displaying the saved history information on a display unit when the inputted authentication information is identical to previously registered information.

According to yet still another aspect of the present invention, a network management method in a network management system comprises:

a receiving step of receiving an email sent via a network;

a first determining step of determining whether or not the received email is an unsolicited email;

an extracting step of extracting access information for accessing a web page and/or email address information that are written in body of the email or in a document file attached to the email when the email is determined to be an unsolicited email in the first determining step; and a saving step of saving, in a database, the access information and/or the address information extracted by the extracting unit.

According to still yet another aspect of the present invention, a program stored in a recording medium for causing a computer to execute:

a transmitting/receiving step of transmitting/receiving an email via a network;

a first saving step of saving, in a database, first history information including the address of at least one of the destination and the source of the email written in the email;

a receiving step of receiving transmission information in which access information for accessing a web page via a network is written;

a second saving step of saving, in the database, second history information including the access information written in the transmission information;

an input step of inputting authentication information for identifying a user; and a display control step of selectively displaying the first history information saved in the first saving step and the second history information saved in the second saving step in a predetermined display format on a display unit by switching between the first history information and the second history information based on an instruction inputted by a user when the inputted authentication information is identical to previously registered information.

According to yet still another aspect of the present invention, a program stored in a recording medium for causing a computer to execute:

a receiving step of receiving an email sent via a network;

a saving step of saving, in a database, history information including access information for accessing a web page that is written in body of the email or in a document file attached to the email;

an input step of inputting authentication information for identifying a user; and a display control step of displaying the saved history information on a display unit when the inputted authentication information is identical to previously registered information.

According to still yet another aspect of the present invention, a program stored in a recording medium for causing a computer to execute:

a receiving step of receiving an email sent via a network;

a first determining step of determining whether or not the received email is an unsolicited email;

an extracting step of extracting access information for accessing a web page and/or email address information that are written in body of the email or in a document file attached to the email when the email is determined to be an unsolicited email in the first determining step; and a saving step of saving, in a database, the access information and/or the address information extracted by the extracting unit.

Further features of the present invention will become apparent from the following description of exemplary embodiments with reference to the attached drawings.

BRIEF DESCRIPTION OF THE DRAWINGS

FIG. 15 is a diagram of an exemplary email that shows a list of quarantined emails.

FIG. 16 is a diagram of an exemplary web screen displaying a list of quarantined emails.

FIG. 17 is a diagram of an exemplary web screen that shows the content of an unsolicited email.

FIG. 18 is a diagram of an exemplary web screen that shows the content of an unsolicited email.

FIG. 20 is a diagram of an exemplary management screen displaying, in time-series, history information including URL information written in access information for accessing a web page via a network.

FIG. 21 is a diagram of an exemplary management screen displaying, in time-series, history information including the address of at least one of the destination and source of written in email transmitted/received via a network.

FIG. 22 is a diagram of an exemplary management screen displaying, in time series, history information including the address of at least one of the destination and source written in web-based email transmitted/received via a network.

FIG. 23 is a diagram of an exemplary web screen through which settings for monitoring unsolicited email are entered.

DESCRIPTION OF THE EMBODIMENTS

Hereinafter, embodiments of the present invention shall be described in detail with reference to the accompanying drawings. However, it should be noted that the constituent elements described in these embodiments are merely exemplary, and are not intended to limit the scope of the present invention. It should also be noted that all the combinations of the features described in the embodiments are not necessary to achieve the means to solve the abovementioned problems according to the present invention.

Embodiment 1

(Network Configuration)

Figure 1:
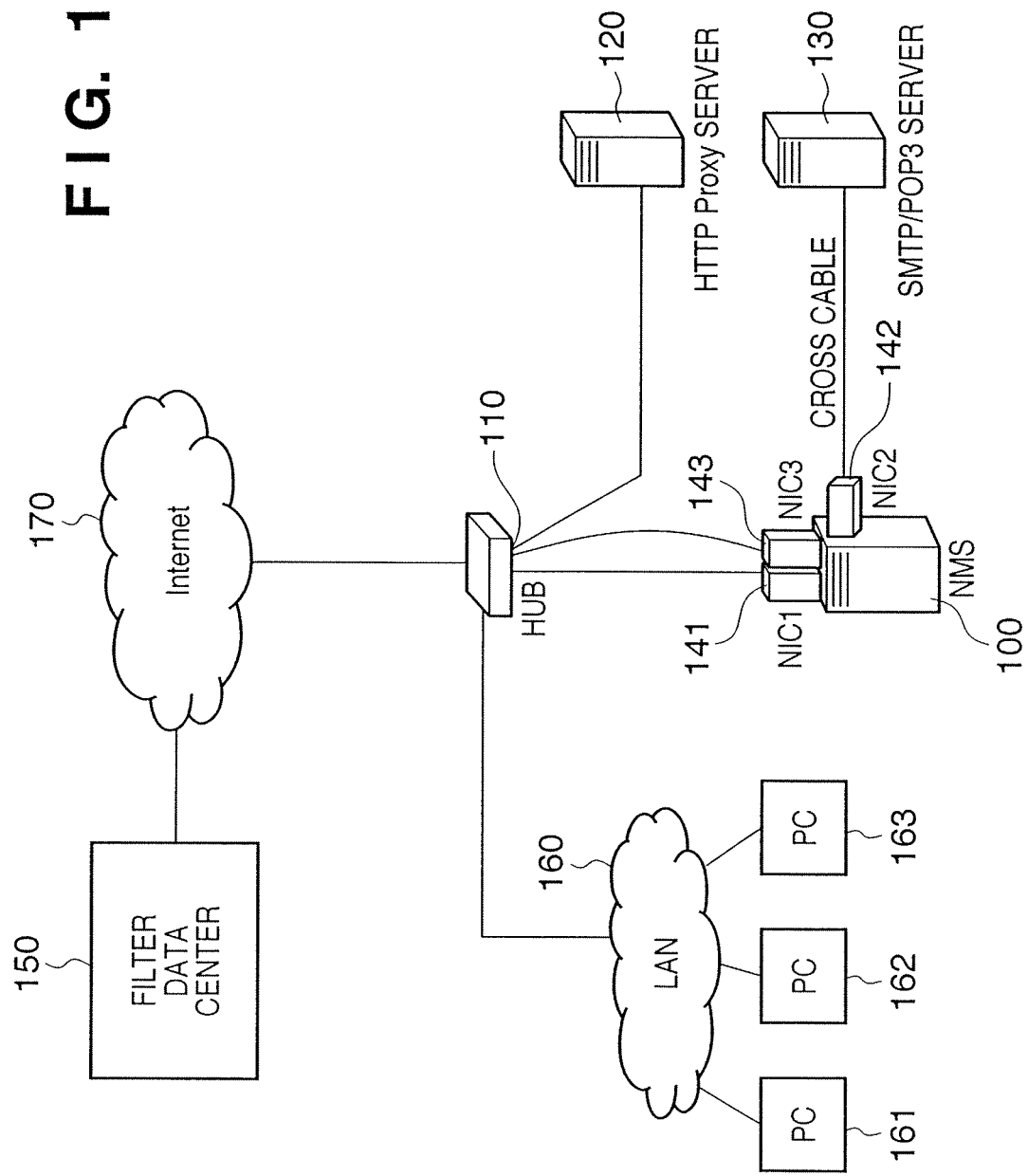
FIG. 1 is a block diagram of an exemplary network configuration.

A network configuration in which a network management apparatus according to the present embodiment is incorporated shall be described first with reference to FIG. 1. FIG. 1 is a block diagram of an exemplary network configuration of the present embodiment. Hereinafter, unless otherwise stated, the same reference numerals are assigned to the same constituent elements in all of the drawings.

In FIG. 1, reference numeral 100 denotes a network management system (NMS) 100. The NMS 100 connects an internal network and the Internet (external network) 170, and controls the data transfer between these networks. With the exception of the Internet 170, the apparatuses and networks connected to a hub 110 together form an internal network. The NMS 100 is implemented by an information processing apparatus such as a personal computer (PC) or work station (WS), but may be implemented by a configuration in which resources are distributed throughout a plurality of devices. For example, the configuration may be such that storage or computational resources are distributed throughout a plurality of apparatuses. Alternatively, the configuration may be such that resources are assigned to respective components that are implemented virtually on the information processing apparatus and are processed in parallel.

In the network configuration of FIG. 1, the Internet network allows connection to various sites, content browsing and email transmission/reception, whereas an intranet or LAN allows content browsing and email transmission/reception.

The hub 110 is a switching hub that relays the data regarding LAN and the Internet to the network management system. The hub 110 is connected to the Internet 170, a LAN 160, the NMS 100, an HTTP proxy server 120, and an SMTP/POP3 server 130.

Reference numeral 120 denotes an HTTP proxy server that handles web page browsing and web-based email on the Internet. The HTTP proxy server 120 executes the communication with the Internet 170 using HTTP protocols for a terminal located on the internal network. Hereinafter, the HTTP proxy server 120 may be referred to simply as "HPS 120". The HPS 120 is implemented by an information processing apparatus such as a PC or WS.

Reference numeral 130 denotes an SMTP/POP server that functions as an email server that manages the transmission/reception of email between terminals connected to the LAN 160 (intranet) and terminals located on the Internet 170. Hereinafter, the SMTP/POP server 130 may be referred to simply as SPS 130. The SPS 130 is implemented by an information processing apparatus such as a PC or WS.

Reference numeral 141 denotes a network interface controller, which is a controller for the SMTP/POP server. Hereinafter, the network interface controller 141 may be abbreviated as "NIC1 (141)".

Reference numeral 142 denotes a network interface controller, which is a controller for the SMTP/POP server 130. Hereinafter, the network interface controller 142 may be abbreviated as "NIC2 (142)".

Reference numeral 143 denotes a network interface controller, which is a controller for an HTTP packet monitor. Hereinafter, the network interface controller 143 may be abbreviated as "NIC3 (143)".

Reference numeral 150 denotes a filter data center (FDC: adaptive filter data center) serving as a management apparatus, and is an information processing apparatus that manages an adaptive spam filter (filter information) for determining unsolicited email. Specifically, the FDC 150 manages information of unwanted emails such as unsolicited email, commercial email, and virus-infected email (for example, data learned in Bayesian filter) as an adaptive spam filter. Further, the FDC 150 collects information regarding harmful sites or sites irrelevant to business operations, and stores it as an adaptive phishing filter. The FDC 150 has a database that stores this information, and updates the database independently or dependently. As used herein, to update the database dependently means that the database is updated by information from the network management system. The FDC 150 is connected to the Internet 170, and is implemented by an information processing apparatus such as a PC or WS.

Reference numeral 160 denotes a local area network (LAN), and forms an intranet (internal LAN). The LAN 160 is connected to various information devices (portable terminals, computers, servers, etc.) 161 to 163, and web access and email transmission/reception are performed by these information devices. Hereinafter, unless otherwise stated, the term "email" used herein encompasses web-based email as well. The LAN 160 is connected also to the NMS 100 via the hub 110. The present embodiment assumes the case in which the LAN 160 is implemented by a wired LAN, but it may be configured using any line as long as data transmission/reception is possible, regardless of whether that line is wired or wireless. For example, the LAN 160 may be implemented by a public line (analog line, ISDN, etc.), WAN, wireless LAN, or the like.

Reference numeral 170 denotes the Internet, which is a network that allows communication between terminals all over the world. In FIG. 1, the FDC 150 and the hub 110 are connected to the Internet 170.

(Hardware Configuration of NMS)

Figure 2:
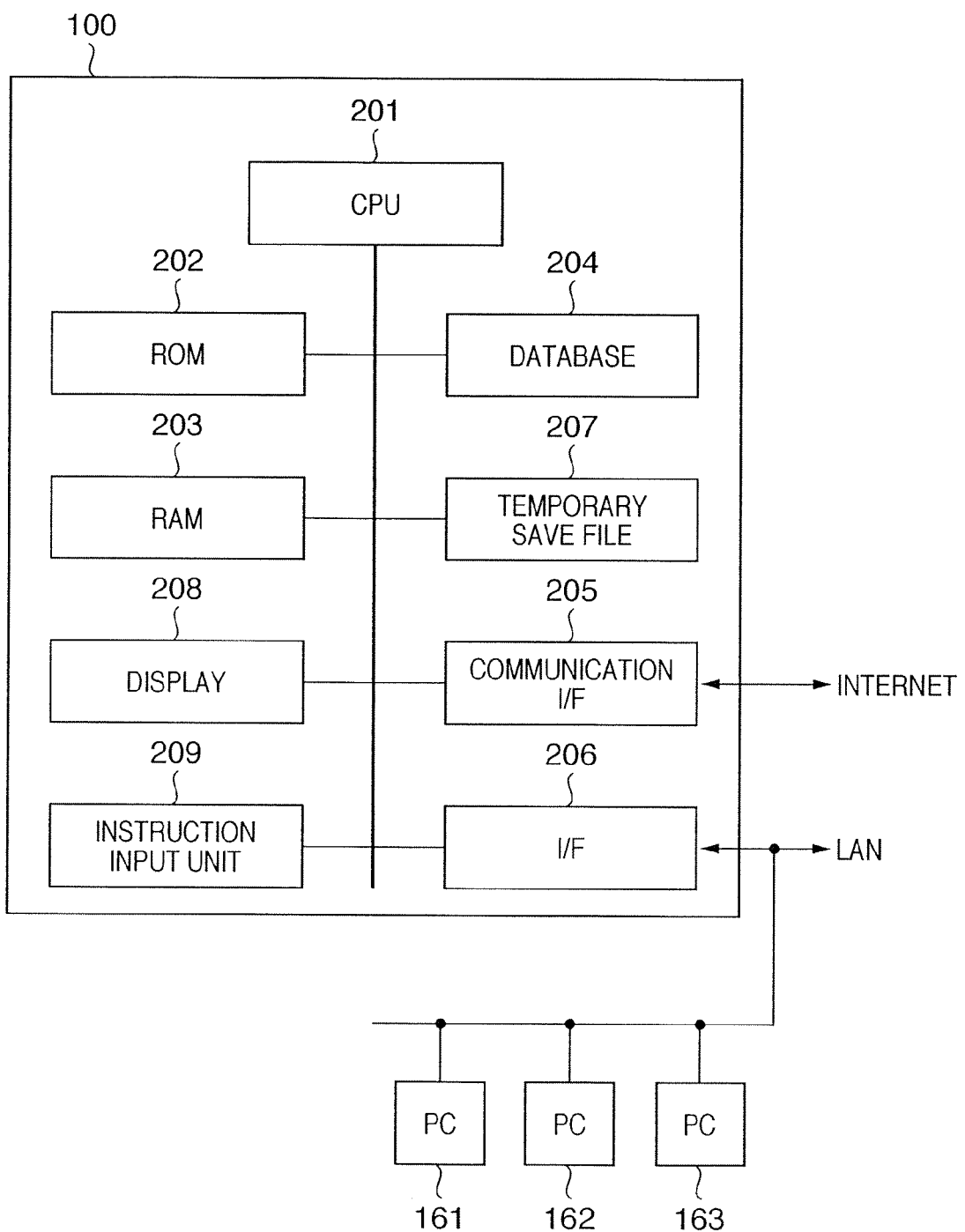
FIG. 2 is a schematic block diagram of a hardware configuration of a network management system (NMS).

The hardware configuration of the NMS 100 shall be described next with reference to FIG. 2. FIG. 2 is a schematic block diagram of a hardware configuration of the NMS 100.

In FIG. 2, reference numeral 201 denotes a CPU (central processing unit) that executes a program, which shall be described later, to perform various controls and processes.

Reference numeral 202 denotes a ROM (read only memory) that stores programs such as a basic I/O program and various data such as font data and template data used in the basic process. In this embodiment, the ROM 202 functions as a program memory that stores a program that corresponds to the process that shall be described later and other programs. The programs in the ROM 202 are read out and executed by the CPU 201 to perform processing and control.

Reference numeral 203 denotes a RAM (random access memory) for temporarily storing various data, and functions as a main memory, working area and the like for the CPU 201. For example, the condition of each unit of the management system, information to be processed and other information are stored in the RAM 202.

Reference numeral 204 denotes a database that is regularly updated by the data of the FDC 150, or updates its own data in the manner as shall be described later, and transfers the updated data to the FDC 150. This database stores data to be filtered, such as URLs, email addresses, or IP addresses. The database 204 can be provided in a large capacity storage apparatus such as a hard disk drive. Hereinafter, the database 204 is used to implement the functions of a CSV file storage unit 407, a database output unit 409, a quarantine unit 411, an adaptive filter database 380, and the like shown in FIGS. 3B and 4.

Reference numeral 205 denotes a communication interface (communication I/F) that is used to connect to the Internet 170 via the hub 110. Reference numeral 206 denotes an interface (I/F) that is connected to the PCs (personal computers) connected with an intranet LAN, such as the information devices 161 to 163. In FIG. 2, the communication I/F 205 and the I/F 206 are described separately, but they may be implemented by using the same physical interface.

Reference numeral 207 denotes a file saving unit that temporarily stores files. The file saving unit 207 can be implemented by the RAM 203 or a hard disk drive (not shown in the drawings). Reference numeral 208 denotes a display that displays, for example, the email history stored in the database 204, the commands input from an instruction input unit 209 (which shall be described later), the output from the NMS 100 in response to the commands, and so on.

Reference numeral 209 denotes an instruction input unit, which may be a keyboard, pointing device (mouse, etc.), touch panel, or the like. The user inputs/instructs commands for controlling the apparatus or the like to the NMS 100 by using the instruction input unit 996. The instruction input unit 209 inputs, for example, authentication data (an ID or password) of the administrator necessary to view an email history or the like, a mouse operation or key operation to switch the display screen by selecting an icon on the display 208, and the like.

(Functionality of NMS)

Figure 3A:
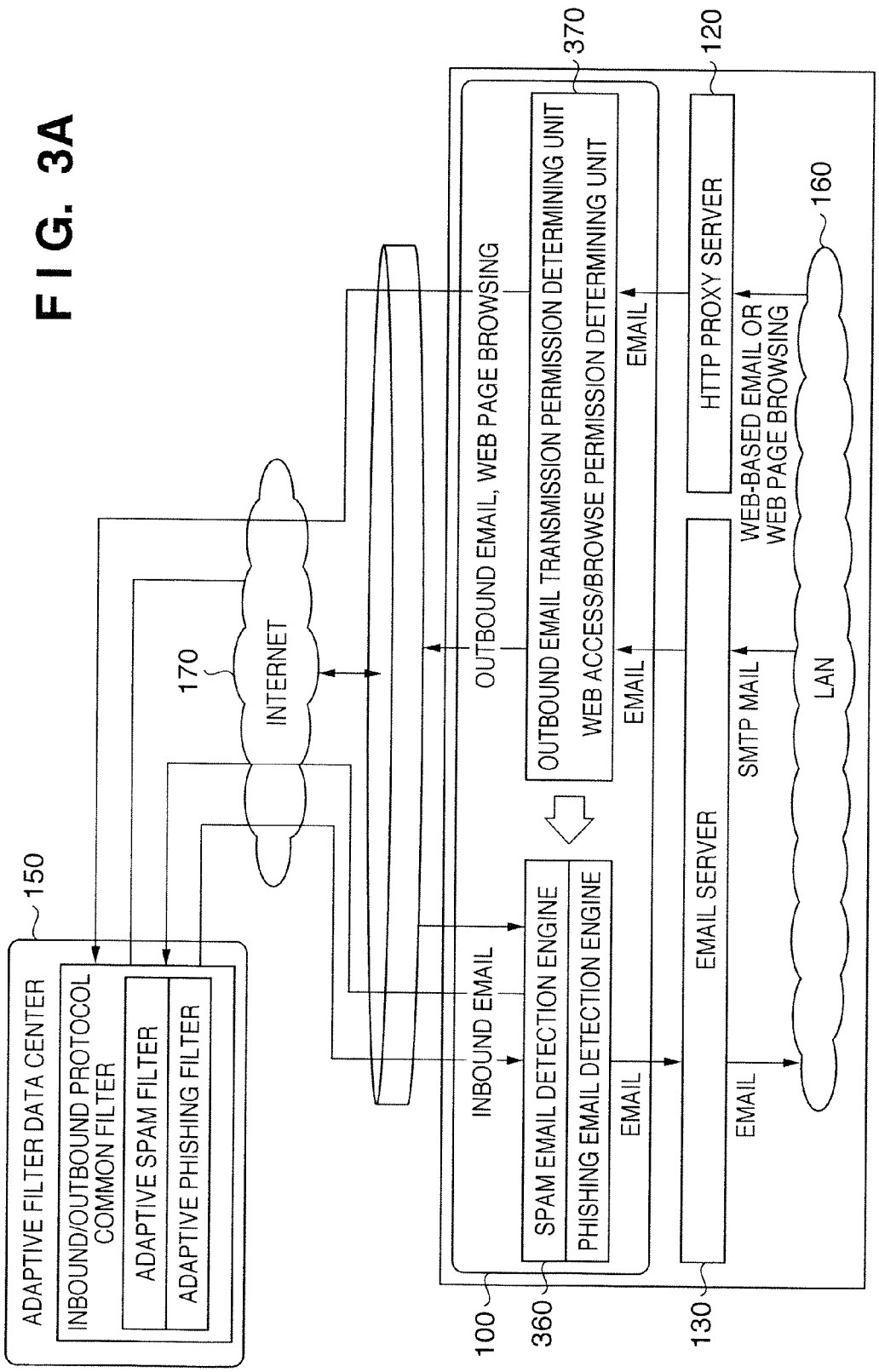
FIGS. 3A and 3B are block diagrams used to illustrate the main functionality of the NMS.
Figure 3B:
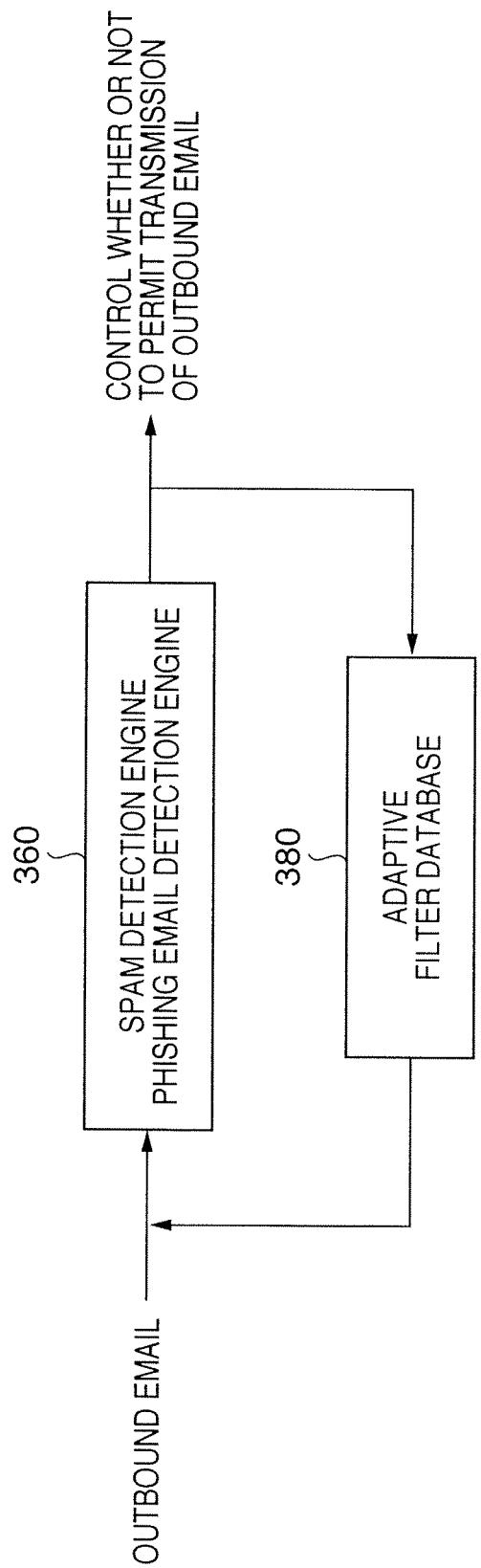

FIGS. 3A and 3B are block diagrams used to illustrate the main functionality of the NMS 100. In FIG. 3A, reference numeral 150 denotes an adaptive filter data center (FDC: filter data center). The NMS 100 performs communication with the external FDC 150 that is connected to the NMS by the Internet, and with various sites that are connected to the Internet 170 as shown in FIG. 1.

The functionality of the NMS 100 can be broadly classified into inbound function (INFUC: In-Function) and outbound function (OUTFUC: Out-Function). The inbound function is a function for processing information flowing in from the Internet 170 to the internal LAN 160. The outbound function is a function for processing information flowing out from the internal LAN 160 to the Internet 170. In the present embodiment, an email that flows in from the Internet 170 to the internal LAN 160 is called an "inbound email (In email)". Likewise, an email that is transmitted from the internal LAN 160 to the Internet 170 is called an "outbound email (Out email)".

As the inbound function, the NMS 100 has a spam detection engine that detects spam, and a phishing email detection engine that detects phishing email.

The spam detection engine is sometimes abbreviated as "SDE". Likewise, the phishing email detection engine is sometimes abbreviated as "FDE". In FIGS. 3A and 3B, these engines are collectively referred to as an inbound unit 360. The NMS 100 receives learned data from the database of the external FDC 150 and stores data that the NMS 100 has collected in order to detect unsolicited email such as spam and phishing email. The NMS 100 also transmits its own collected data to an internal adaptive filter database 380.

As the outbound function, the NMS 100 performs processing and control regarding external access and external transmission such as email transmission and web page browsing. For example, in FIG. 3A, the outbound email transmission permission determining unit determines whether or not the destination address of an email is identical to the address saved in the adaptive filter database 380 before transmitting the email. If the outbound email transmission permission determining unit determines that the destination address is identical, the NMD 100 performs processing such as blocking the transmission of the email or issuing a warning. Also, upon receiving access information in which a URL for accessing a web page via a network is written, a web access/browse permission determining unit determines whether or not the URL is identical to the URL saved in the adaptive filter database 380. If the web access/browse permission determining unit determines that the URL is identical, the NMS 100 performs processing such as blocking the transmission of the access information or issuing a warning. In FIG. 3A, the functional elements for implementing the outbound function such as the outbound email transmission permission determining unit and the web access/browse permission determining unit are collectively referred to as an outbound unit 370.

In FIG. 3A, the email server (MS) 130 corresponds to the SMTP/POP server 130 shown in FIG. 1. The HTTP proxy server (HPS) 120 corresponds to the HPS 120 shown in FIG. 1. The LAN (internal LAN) 160 is an intranet network, and various types of information device PCs 161 to 163 are connected to the internal LAN 160. When transmitting an email, the spam detection engine and the phishing email detection engine of the inbound unit 360 are configured to refer to the filter to permit the transmission.

(Functional Configuration of NMS)

Figure 4:
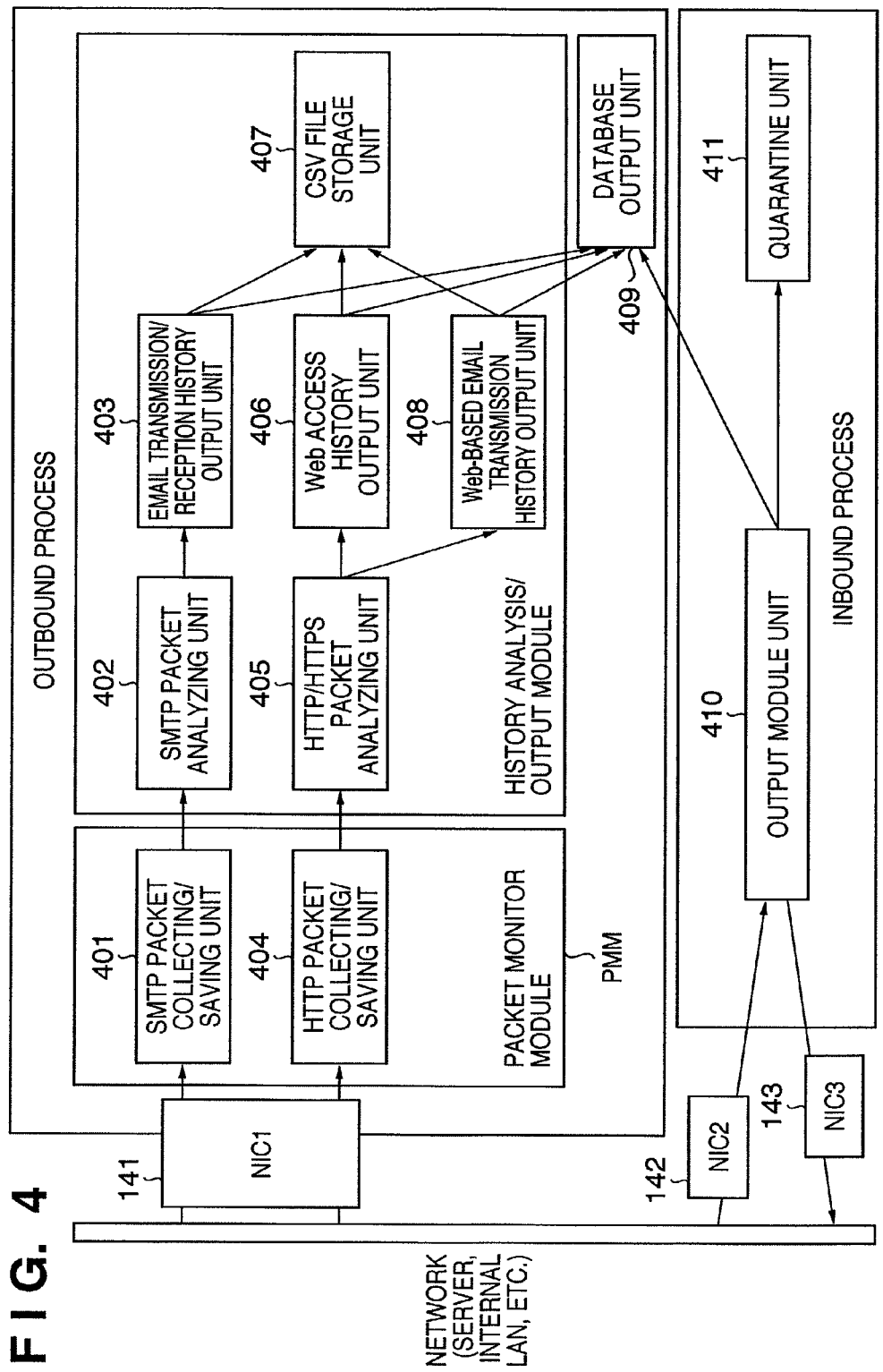
FIG. 4 is a block diagram used to further illustrate the NMS.

FIG. 4 is a block diagram used to illustrate the NMS 100 in further detail, and the functionality implemented by a program and hardware according to the present embodiment shall be described as blocks.

Reference numeral 401 denotes an SMTP packet collecting/saving unit that collects packets for transmitting/receiving email and temporarily stores the packets in a save file. Reference numeral 402 denotes an SMTP packet analyzing unit that analyzes the packets collected by the SMTP packet collecting/saving unit 401. Reference numeral 403 denotes an email transmission/reception history output unit that keeps the history of email sent in packets. In other words, the email transmission/reception history output unit 403 outputs history information including the email address of at least either of the source and destination of the SMTP packets analyzed by the SMTP packet analyzing unit 402.

Reference numeral 404 denotes an HTTP packet collecting/saving unit that includes a storage unit for temporarily storing the collected HTTP packets. In other words, the HTTP packet collecting/saving unit 404 receives HTTP packets (access information) in which URL information for accessing a web page via a network is written. Reference numeral 405 denotes an HTTP/HTTPS packet analyzing unit that analyzes the packets collected by the HTTP packet collecting/saving unit 404. Reference numeral 406 denotes a web (page) access history output unit that saves the web history sent in packets. In other words, the web access history output unit 406 saves the history information, including URL information, described in HTTP packets.

Reference numeral 407 denotes a CSV file storage unit that saves the email history and the web page access history in CSV (comma separated values, which is a data array format for spreadsheets) format. Reference numeral 408 denotes a web-based email transmission history output unit that saves the web-based email transmission history in CSV format in the CSV file unit 407.

Reference numeral 409 denotes a database (DB) that stores the data of the email transmission/reception history output unit 403, the web access history output unit 406, and the web-based email transmission history output unit 408. The stored data form a database of information to be filtered. The database 409 is managed by the CPU 201, and the data is transmitted to the external FDC 150. Further, the data from the external FDC 150 is written in the database. The database 409 corresponds to the adaptive filter database 380 of FIG. 3B.

Reference numeral 410 denotes an output module unit that detects and quarantines spam, virus-infected email, and phishing email, and outputs email history and the like. In other words, the output module unit 410 detects spam and the like, performs output for quarantining the whole (entire body, attached file, etc.) of the detected email, and outputs log history including the source address, URLs, and the like contained in the body of the detected spam and the like. Reference numeral 411 denotes a quarantine unit that quarantines the spam, virus-infected email and phishing email output from the output module unit 410. Reference numeral 141 denotes a controller that corresponds to the NIC1 (141) shown in FIG. 1; reference numeral 142 denotes a controller that corresponds to the NIC2 (142) shown in FIG. 1 and reference numeral 143 denotes a controller that corresponds to the NIC3 (143) shown in FIG. 1.

The SMTP packet collecting/saving unit 401 and the HTTP packet collecting/saving unit 404 are collectively called a "packet monitor module (PMM)". Likewise, reference numerals 402, 403 and 405 to 408 are collectively called a "history analysis/output module".

The above-described history information is stored in the database (DB) 409 in time series. The NMS 100 generates a management screen displaying history information in time-series based on the history information stored in the DB, and displays the screen on a display apparatus. Specifically, the NMS 100 generates an HTML screen displaying history information based on the history information stored in the DB 409, and displays the screen on a display apparatus. FIG. 20 is a diagram of an exemplary management screen displaying, in time series, history information including URL information written in access information for accessing a web page via a network. FIG. 21 is a diagram of an exemplary management screen displaying, in time series, history information including the address of at least one of the destination and source written in email transmitted/received via a network. FIG. 22 is a diagram of an exemplary management screen displaying, in time series, history information including the address of at least one of the destination and source written in web-based email transmitted/received via a network.

The display apparatus that displays the management screen generated by the NMS 100 is not limited to the display 208 equipped in the NMS 100, and may be a display equipped in an information device that can communicate with the NMS 100. In the present embodiment, the configuration may be such that the system administrator (user) can check the history information by referring to the management screen generated by the NMS 100. The apparatus operated by the system administrator may be any apparatus as long as it can communicate with the NMS 100, but for the sake of simplicity, the information device 161 is used in this embodiment.

If the user wishes to change the display order of the history which is saved in the database DB 409, the user transmits an instruction to change the order to the NMS 100 by operating a browser of the information device PC. The NMS 100 extracts history data for display from the database 409 and sorts the data by time (in ascending or descending order) based on the instruction, and transmits the screen to the browser of the information device PC. In other words, the NMS 100 causes the display apparatus of the information device PC to display the history information in time series. This enables the user to easily understand the history at a glance. Also, the NMS 100 changes the display order of the history information (in ascending or descending order) according to an instruction input by the user, and displays it on a display apparatus. This allows the user to view desired history information instantly.

Also, the NMS 100 selectively switches between history information regarding email and history information regarding web access based on an instruction input by the user, and displays it in a predetermined display format on a display apparatus. For example, in the exemplary screens shown in FIGS. 20 to 22, buttons (icons) for switching the display screen are provided on the left of the screen. The screen is switched between those shown in FIG. 20 to 22 according to the selection of the user. For example, if the Web-Based Email Monitoring button is selected, the screen is switched to a display of web-based email history information as shown in FIG. 22. If an Email Log button (Monitoring button 2004, 2115, 2204) is selected, the screen is switched to a display of email history information as shown in FIG. 21.

Figure 5:
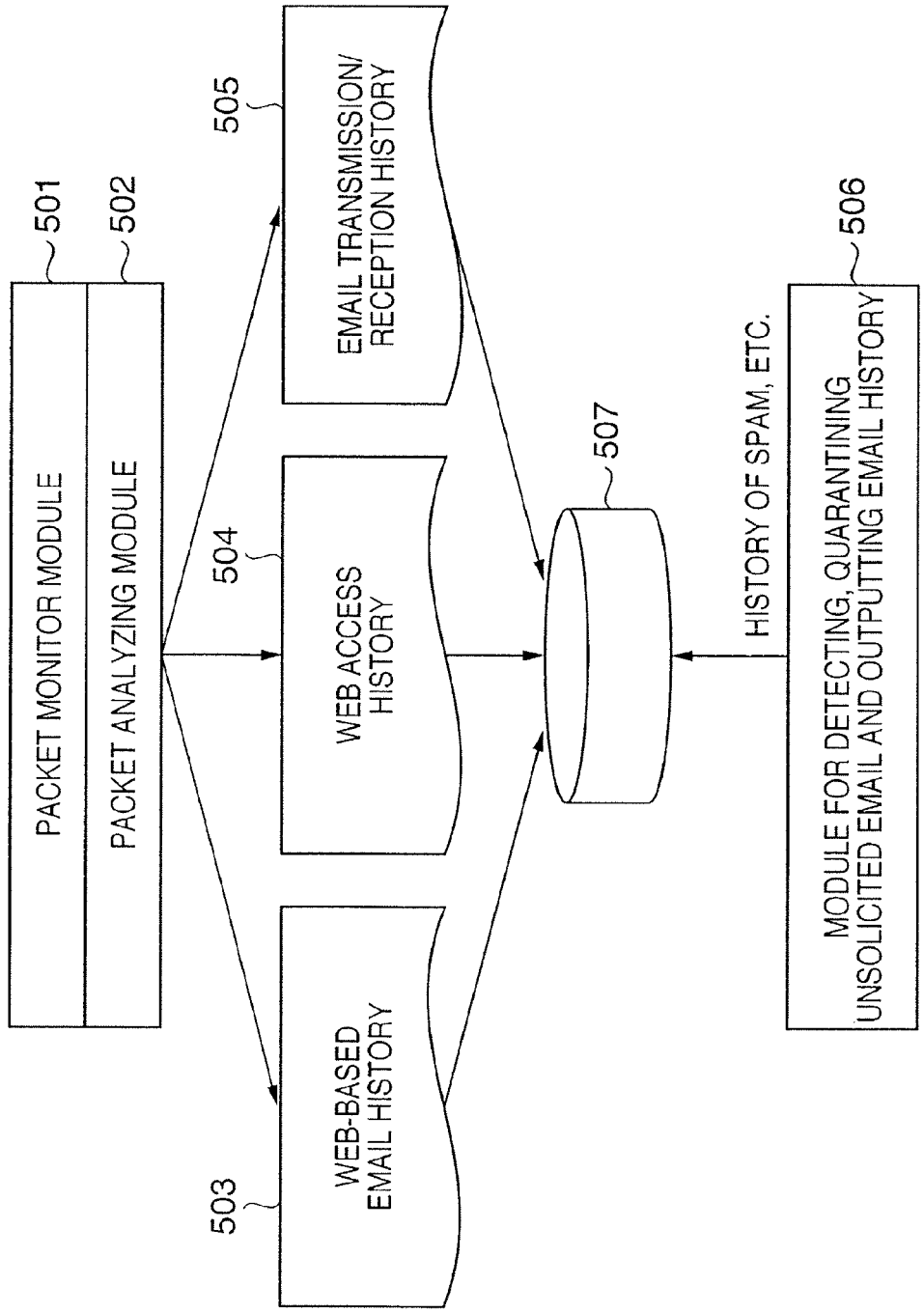
FIG. 5 is a conceptual diagram of information stored in a database (DB).

The database 409 stores data to be filtered in the database DB 409 as shown in FIG. 5. FIG. 5 is a conceptual diagram of information stored in the DB 409. The content of the database DB is transmitted to the external FDC 150. As shown in FIG. 5, the database DB 409 stores the data of web access history 504, web-based email transmission/reception history 503, email transmission/reception history 505, and the like. These data are generated based on the process of a packet monitor module 501, a packet analyzing module 502, and the like. Further, information such as email addresses of spam, virus-infected email, phishing email and the like, and the URLs of improper sites, is also stored (506), which serves as reference data for filtering sites. The packet monitor module 501 corresponds to the packet monitor module (PMM) of FIG. 4. Likewise, the packet analyzing module 502 corresponds to the history analysis/output module of FIG. 4.

(Operation of NMS)

The operation of the present embodiment as configured above shall be described with reference to the flowcharts shown in FIGS. 6 to 11 and the exemplary display screens shown in FIGS. 15 to 23. Unless otherwise stated, each step of the processes described with reference to the flowcharts is executed under control of the CPU 201.

Figure 6:
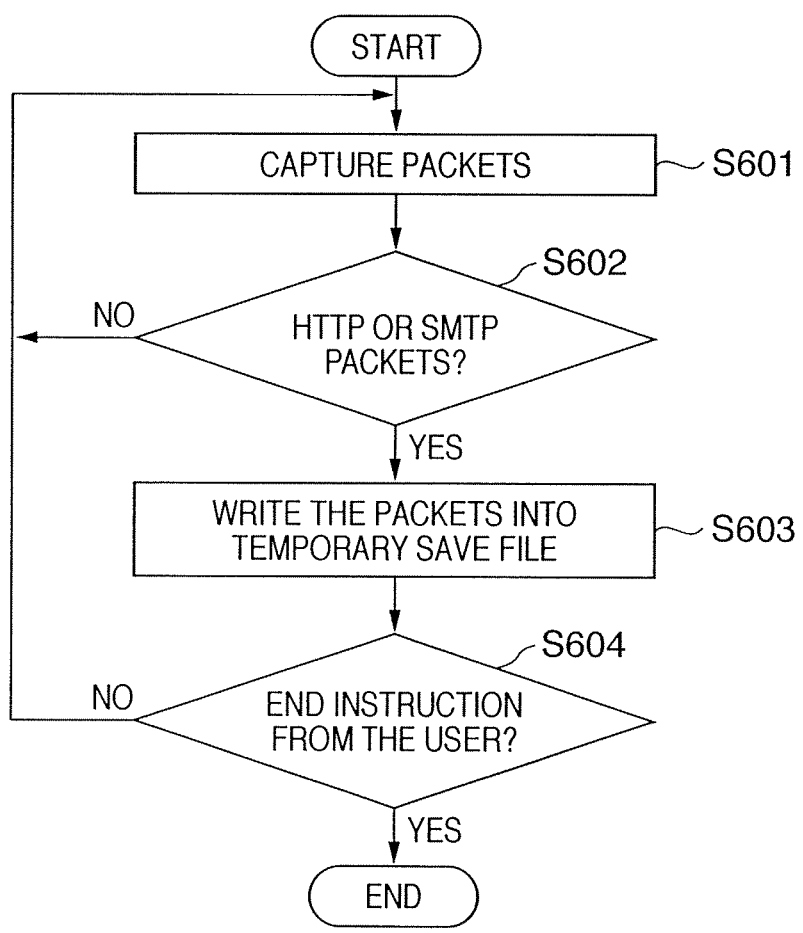
FIG. 6 is a flowchart illustrating a process regarding transmission/reception history executed by a packet monitor module.

The process executed by the packet monitor module shall be described first with reference to FIG. 6. FIG. 6 is a flowchart illustrating a process regarding transmission/reception history executed by the packet monitor module (PMM) shown in FIG. 4.

In step S601 of FIG. 6, the CPU 201 of the NMS 100 shown in FIG. 1 captures packets. In the next step, step S602, it is determined whether or not the captured packets are HTTP packets or SMTP packets. If it is determined that the captured packets are HTTP packets or SMTP packets (YES in step S602), the process advances to step S603. Otherwise (NO in step S602), the process returns to step S601. In step S603, the captured packets are written in the temporary save file 207, and the process advances to step S604. In step S604, it is determined whether or not an end instruction has been issued by the user. If an end instruction has been issued (YES in step S604), the process ends. If an end instruction has not been issued (NO in step S604), the process returns to step S601 again to repeat the process.

Figure 7:
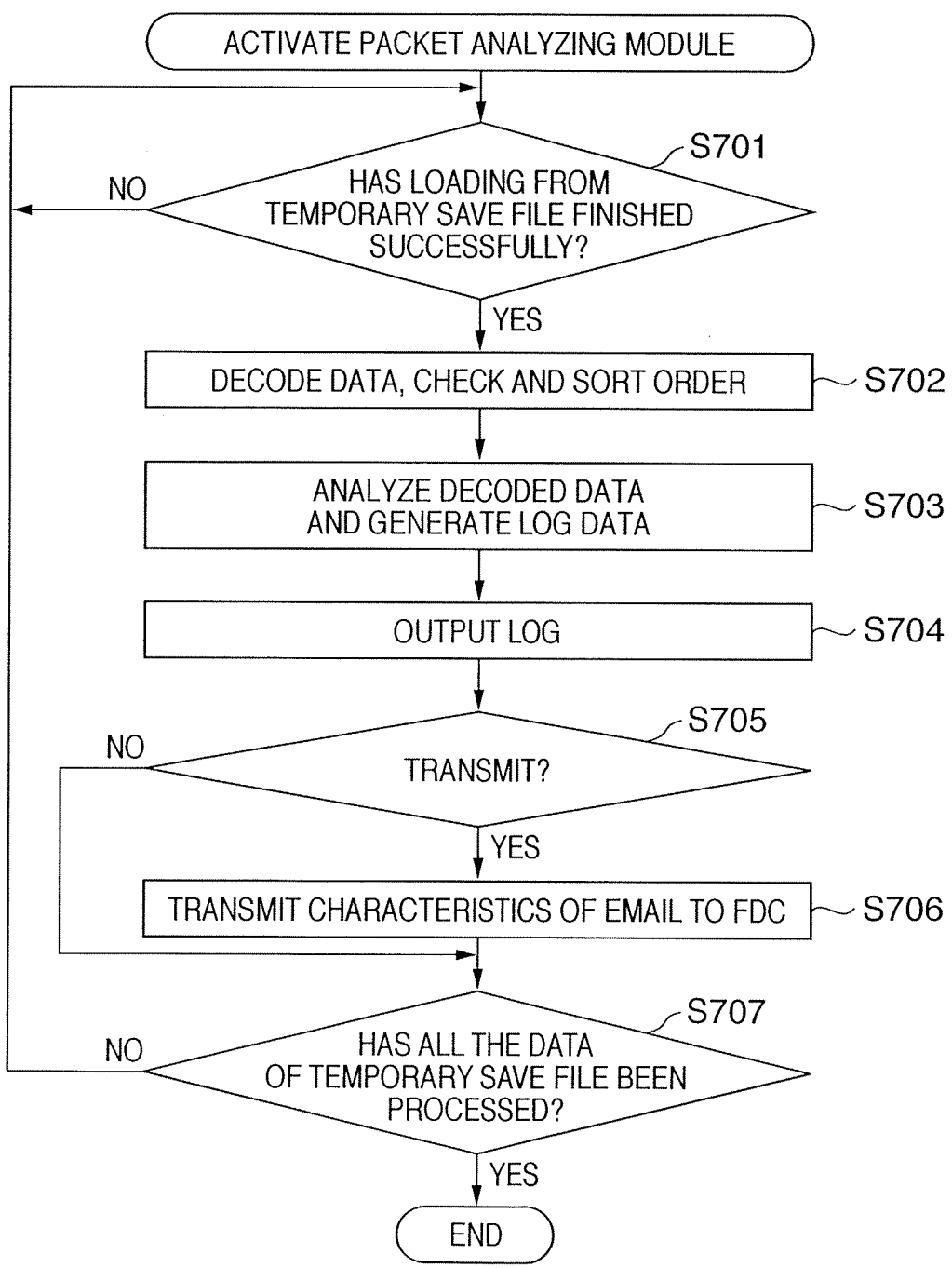
FIG. 7 is a flowchart illustrating a process executed by a packet analyzing module.

The process performed by the packet analyzing module 502 (analysis output unit HAOM) shall be described next with reference to FIG. 7. FIG. 7 is a flowchart illustrating a process executed by the packet analyzing module 502.

First, in step S701 of FIG. 7, packets are loaded from the temporary save file 207 of the packet module. After the packet loading is finished (YES in step S701), the process advances to step S702. In step S702, the data for each TCP connection is decoded, and the order is checked and sorted.

Next, in step S703, the decoded data is analyzed and log data is generated. Then, in S704, the log is output to the CSV file 407 or the database DB 409. For example, if the decoded data includes information regarding a plurality of temporarily saved emails, the contact address and email subject of the transmitted/received emails are stored together with the own address as history.

Subsequently, in step S705, it is determined whether or not to transmit the email, or in other words, whether or not the email is an email transmitted from the internal LAN 160 to the Internet 17. If it is determined that the email to be processed is to be transmitted (YES in step S705), the process advances to step S706. Otherwise (NO in step S705), the process advances to step S707. In step S706, the characteristics of the email are transmitted to the FDC 150 as normal email information, and the process advances to step S707.

In step S707, it is determined whether or not all the data 207 of the temporary save file 207 has been processed. If all the data has been processed (YES in step S707), the process ends. If there is data to be processed (NO in step S707), the process returns to step S701, and the process is continued.

The process for detecting an unsolicited email such as spam, virus-infected email, or phishing email shall be described next with reference to FIGS. 8 to 11.

Figure 8:
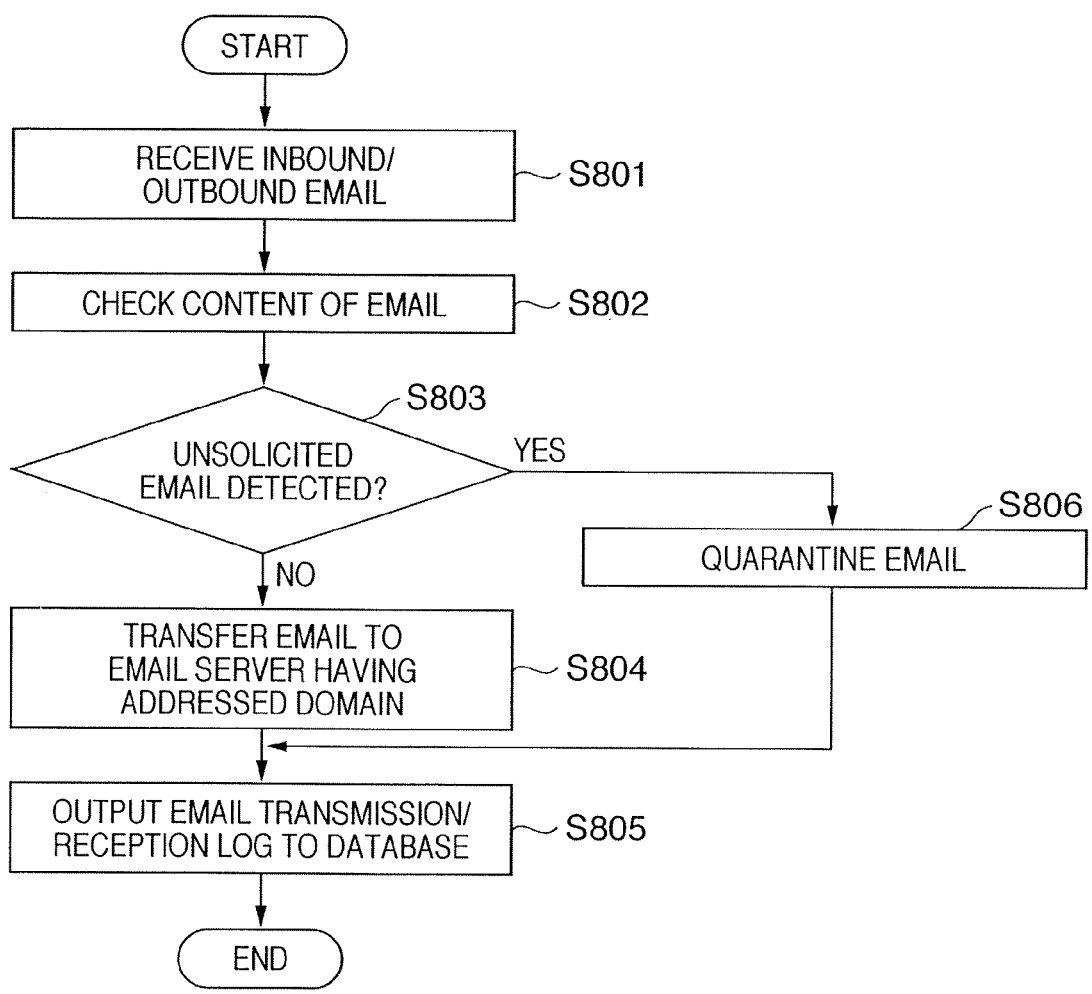
FIG. 8 is a flowchart illustrating a process executed when receiving an email.

FIG. 8 is a flowchart illustrating a process executed when receiving an email. In FIG. 8, an email is received in step S801. Note that the email received in this step includes both inbound email and outbound email. Next, in step S802, the email is checked by the spam detection engine and the phishing email detection engine of the inbound unit 360, or the like. Next, in step S803, it is determined from the result of the detection performed in step S802 whether or not the email is an unsolicited email (spam, virus-infected email, phishing email, etc.). If the email is an unsolicited email (YES in step S803), the process advances to step S806. If it is not an unsolicited email (NO in step S803) the process advances to step S804.

In step S806, the email received in step S801 is quarantined, and recorded in the quarantine email record of the quarantine unit 411. Then, the process advances to step S805. On the other hand, in step S804, the email is transferred to the email server (MS) having the address domain of the email, and the process advances to step S805.

In step S805, the email transmission/reception log is output to the DB 409. Then, the process ends.

Figure 9:
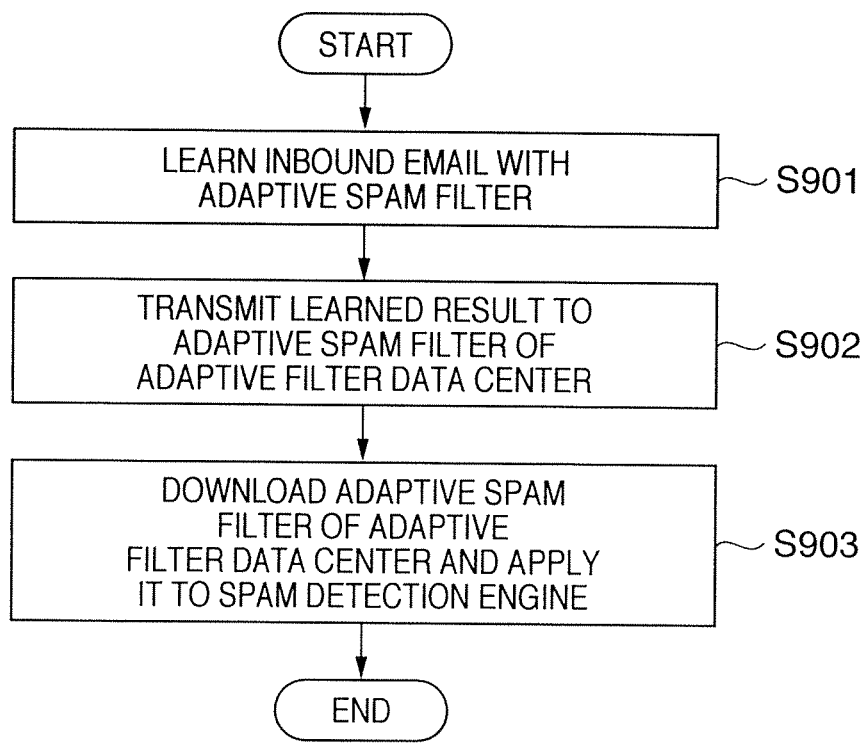
FIG. 9 is a flowchart illustrating a process for updating filter information when a received email is determined to be an unsolicited email.

FIG. 9 is a flowchart illustrating a process for updating filter information when a received email is determined to be an unsolicited email. In FIG. 9, first, the email received in step S901 is learned by an adaptive spam filter. This adaptive spam filter is incorporated in a hard disk drive (not shown in the drawings) of the NMS 100.

Next, in step S902, the learned result is transmitted to the database of the FDC 150, in which the result is learned (or registered). Next, in step S903, the data of the database of the FDC 150 is downloaded, and applied to the adaptive spam filter of the NMS 100. Then, the process ends.

Figure 10:
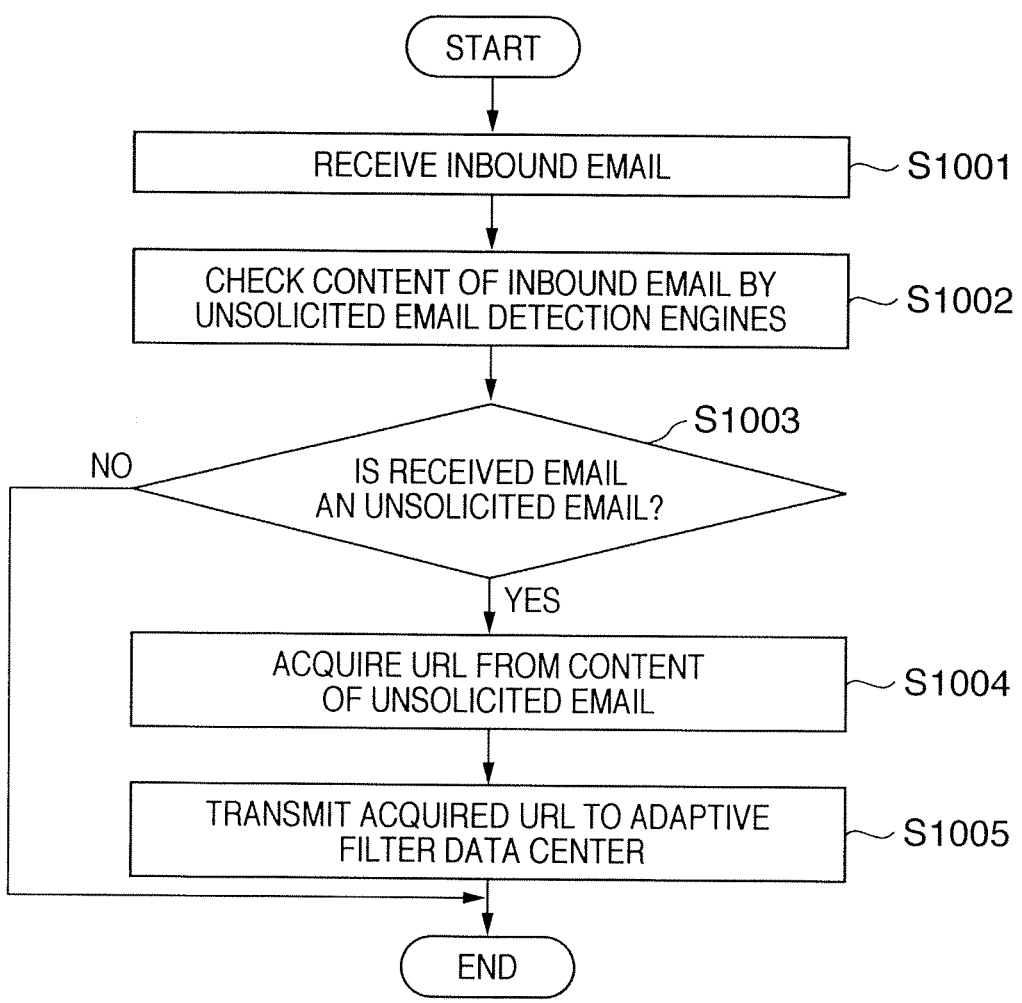
FIG. 10 is a flowchart illustrating a process of learning the web page identified by a URL contained in an unsolicited email as a harmful site.

The handling of URL (website) information shall be described next with reference to FIG. 10. FIG. 10 is a flowchart illustrating a process of learning the web page identified by a URL contained in an unsolicited email as a harmful site.

First, in step S1001, an inbound email addressed to a terminal (161 to 163) of the internal LAN 160 is received from the Internet 170. Next, in step S1002, the content of the email is checked by the unsolicited email detection engine.

Then, in step S1003, it is determined whether or not the received email is an unsolicited email. If the received email is determined to be an unsolicited email (YES in step S1003), the process advances to step S1004, whereas if the received email is determined to be not an unsolicited email (NO in step S1003), the process of FIG. 10 ends.

In step S1004, URL information is acquired from the inbound email determined to be an unsolicited email. In other words, URL information shown as a link to a website is acquired by referring to the body of the inbound email and its attached file. For example, the URL information can be acquired by searching for an area where HTML anchor tags <a> are present. The acquired URL information and the address of the email are stored in the common database.

Next, in step S1005, the acquired URL information is transmitted to and registered (or learned) in the FDC 150. Then, the process ends.

Figure 11A:
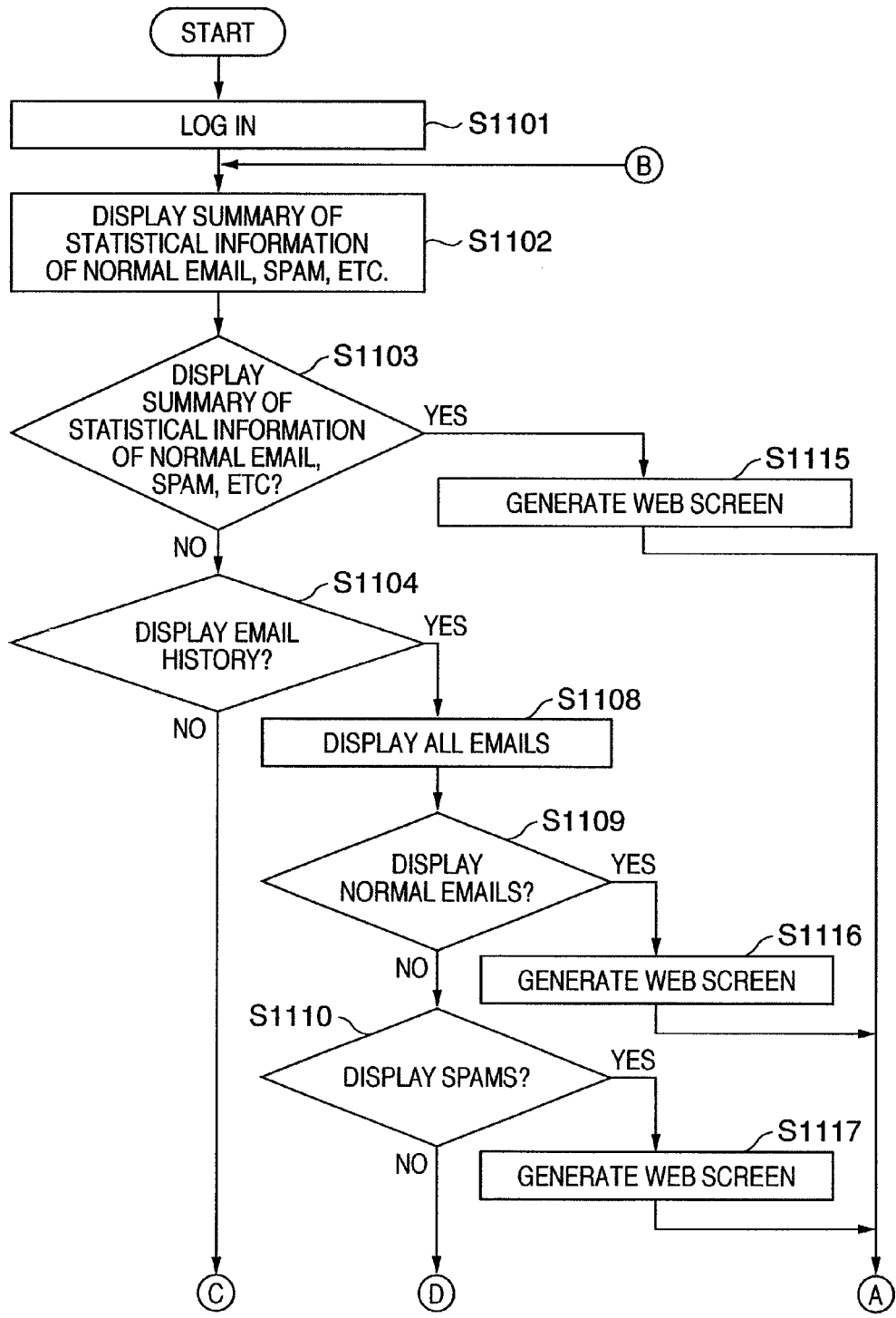
FIGS. 11A and 11B are a flowchart illustrating a process for executing a monitoring operation.
Figure 11B:
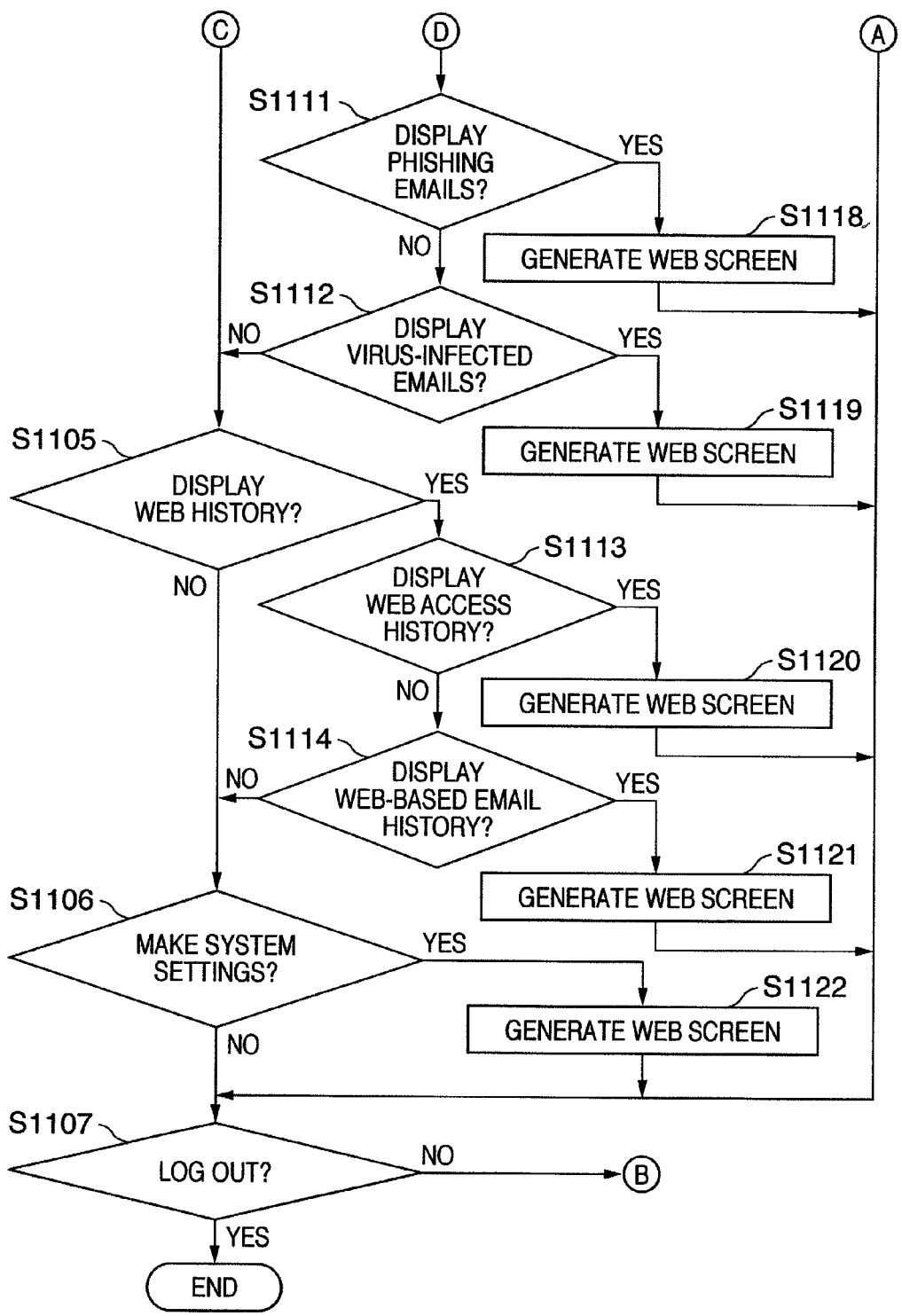

The process (monitoring operation) for displaying the history information stored in the DB 409 on a display apparatus (the display 208 or a display of the information device 161, etc.) shall be described next with reference to FIG. 11A, 11B and FIGS. 15 to 23. FIGS. 11A and 11B are a flowchart illustrating a process for executing the monitoring operation.

Figure 19:
FIG. 19 is a diagram of an exemplary login screen.

First, in step S1101, a login screen is displayed on the screen of the display apparatus as shown in FIG. 19. FIG. 19 is a diagram of an exemplary login screen. The login screen accepts an input of authentication information for identifying the user such as an ID and a password from an input apparatus of the information device (PC) 161. If the input ID, password, or the like is identical to that registered with the NMS 100, the login is permitted, and the process advances to step S1102. Through the process performed from step S1102 on, the user can view the information managed by the network management system 100.

In the present embodiment, once login is permitted in step S1101, the NMS 100 displays various history information by selectively switching therebetween, without requiring another input of authentication information. However, the NMS 100 may prompt the user to input further authentication information even after login. For example, in response to an instruction to switch the screen to a display of history information, the NMS 100 may require an input of authentication information, and switch the display screen only if correct authentication information registered in advance is input. When prompting the user to input authentication information even after login, it is preferable to use a short password or the same password used for the login as the authentication information because this simplifies the authentication process after login.

In step S1102, information regarding normal email, unsolicited email, and the like is acquired from the database DB 409, and summary information such as statistical information calculated based on the acquired information is obtained. Then, a web screen is generated based on the summary information, and control is performed to display the summary information on a display apparatus. For example, a summary including the number and subject of normal emails and unsolicited emails received 24 hours before login is displayed.

Next, in step S1103, it is determined whether or not to display detailed statistical information. For example, if an instruction to display detailed statistical information is entered by the user, it is determined that the detailed statistical information is to be displayed. When displaying the detailed statistical information (YES in step S1103), the process advances to step S1115, where a web screen containing the detailed statistical information is generated and displayed on a display apparatus. Then, the process advances to step S1107. When it is determined that the detailed statistical information is not to be displayed (NO in step S1103), the process advances to step S1104.

In step S1104, it is determined whether or not to display email history. For example, if an instruction to display email history is entered by the user, it is determined that the email history is to be displayed. Specifically, it may be configured such that a common screen switch region is displayed on all screens shown in FIGS. 20 to 22. In this case, the screen switch region is equipped with a Web Access Monitoring button (2006, 2117, 2206) for switching to a display of web access history information (e.g., FIG. 20), a log view button (Monitoring button 2004, 2115, 2204) for switching to a display of email history information (e.g., FIG. 21), and a Web-Based Email Monitoring button (2005, 2116, 2205) for switching to a display of web-based email history information (e.g., FIG. 22). In step S1104, the NMS 100 can determine to display email history if the log view button (2004, 2115, 2204) is selected. If it is determined that the email history is to be displayed (YES in step S1104), the process advances to step S1108. If it is determined that the email history is not to be displayed (NO in step S1104), the process advances to step S1105.

In step S1105, it is determined whether or not to display the web history. For example, if an instruction to display the web history is entered by the user, it is determined that the web history is to be displayed. The display of web history is performed by displaying web access history. The process branches at step S1105 based on the operation of the Web Access Monitoring button (2006, 2117, 2206) or the Web-Based Email Monitoring button (2005, 2116, 2205). If it is determined that the web history is to be displayed (YES in step S1105), the process advances to step S1113. If it is determined that the web history is not to be displayed (NO in step S1105), the process advances to step S1106.

In step S1106, it is determined whether or not to make system settings with respect to the operation of the NMS 100. For example, if an instruction to make system settings is entered by the user, it is determined that system settings such as the IP addresses of terminals in the network system, and the like are to be made. If it is determined that the system settings are to be made (YES in step S1106), the process advances to step S1122. If it is determined that the system settings are not to be made (NO in step S1106), the process advances to step S1107.

In step S1107, it is determined whether or not to log out. For example, if an instruction to log out is entered by the user, or a predetermined length of time has passed after login, it is determined that logout is to be performed. If it is determined that logout is to be performed (YES in step S1107), the process ends. If it is determined that logout is not to be performed (NO in step S1107), the process returns to step S1102, and the process is repeated.

In step S1108, entire email transmission/reception history is displayed as shown in FIG. 21. FIG. 21 is a diagram of an exemplary screen displaying the entire email transmission/ reception history. In FIG. 21, reference numerals 2101 to 2105 denote buttons that are selected to switch the display screen. Reference numeral 2101 denotes a button for displaying all emails. In response to the selection of the button 2101, the NMS 100 generates a web screen displaying information regarding all types of received emails. In FIG. 21, the button 2101 is selected.

Reference numeral 2102 denotes a button for displaying normal emails. In response to the selection of the button 2102 (YES in step S1109), the NMS 100 generates a web screen displaying a list of information regarding the received normal emails (step S1116). Reference numeral 2103 denotes a button for displaying spam. In response to the selection of the button 2103 (YES in step S1110), the NMS 100 generates a web screen displaying a list of information regarding the received spam (step S1117). Reference numeral 2104 denotes a button for displaying phishing emails. In response to the selection of the button 2104 (YES in step S1111), the NMS 100 generates a web screen that shows a list of information regarding the received phishing emails (step S1118). Reference numeral 2105 denotes a button for displaying virus-infected emails. In response to the selection of the button 2105 (YES in step S1112), the NMS 100 generates a web screen displaying a list of information regarding the received virus-infected emails (step S1119).

In FIG. 21, reference numeral 2110 denotes a column indicating the times when emails are transmitted/received. Reference numeral 2111 denotes a column indicating source email address (upper part) and destination email address (lower part). Reference numeral 2112 denotes a column indicating the subject of email. Reference numeral 2113 denotes a column indicating the handling result of email. Reference numeral 2114 denotes a column indicating a button to report spam. In response to the selection of the spam report button, the NMS 100 registers the current email as a spam.

On the other hand, in step S1113, it is determined whether or not to display the web access history. For example, if an instruction to display the web access history is entered by the user, it is determined that the web access history is to be displayed. When the common screen switch region equipped with various buttons described above is displayed on all the screens shown in FIGS. 20 to 22, if the Web Access Monitoring button (2006, 2117, 2206) is selected, it can be determined that the web access history is to be displayed. If it is determined that the web access history is to be displayed (YES in step S1113), the process advances to step S1120. If it is determined that the web access history is not to be displayed (NO in step S1113), the process advances to step S1114.

In step S1120, a screen displaying web access history is generated and displayed on a display apparatus. FIG. 20 is a diagram of an exemplary screen displaying web access history. In FIG. 20, reference numeral 2001 denotes a column indicating web access time. Reference numeral 2002 denotes a column indicating the IP address of a client terminal (upper part) and the IP address of a web server terminal (lower part) for each line. Reference numeral 2003 denotes a column indicating a URL.

In step S1114, it is determined whether or not to display a web-based email transmission/reception history. For example, if an instruction to display the web-based email history is entered by the user, it is determined that the web-based email history is to be displayed. When the common screen switch region containing buttons for switching the screen is displayed on all the screens shown in FIGS. 20 to 22, if the Web-Based Email Monitoring button (2005, 2116, 2205) is selected, it can be determined that the web-based email history is to be displayed. If it is determined that the web-based email history is to be displayed (YES in step S1114), the process advances to step S1121. If it is determined that the web-based email history is not to be displayed (NO in step S1114), the process advances to step S1106.

In step S1121, a screen displaying the web-based email history is generated and displayed on a display apparatus. FIG. 22 is a diagram of an exemplary screen displaying the web-based email history. In FIG. 22, reference numeral 2201 denotes a column indicating the time when web-based email is transmitted/received. Reference numeral 2202 denotes a column indicating a source address (upper part) and a destination address (lower part) of the web-based email. Reference numeral 2203 denotes a column indicating the subject of the web-based email.

As described above, according to the configuration of the present embodiment, history information including the address of at least one of the destination and source written in an email transmitted/received via a network is saved in the DB 409. Also, in response to the reception of access information in which URL information for accessing a web page via a network is written, the history information including URL information written in the access information is saved in the DB 409. Then, authentication information for identifying the user is input. If the input authentication information is identical to the authentication information registered in advance, the email history information and the web access history information are displayed in a predetermined display format on a display unit by selectively switching between the email history information and the web access history information according to an instruction input by the user.

Therefore, according to the configuration of the present embodiment, email history information and web access history information are displayed in response to user authentication, so that the user can execute web browsing and management of email transmission/reception with an easy operation. Further, once the user is authenticated, email history information and web access history information are displayed by selectively switching therebetween, so that the user can collectively manage access to web sites and email transmission/reception. A conventional technique involves complicated operations since the user had to perform a security operation for each device so as to operate a device for restricting web browsing, a device for quarantining received email, and the like, but the configuration of the present embodiment can reduce the complexity. It is also possible to easily monitor the history of access to inappropriate sites and the spam transmission/reception history. Further, according to the configuration of the present embodiment, a plurality of pieces of information can be monitored with a single device. It is therefore possible to reduce the installation space for the apparatus.

Further, according to the configuration of the present embodiment, history information including URL information for accessing a web page written in the body of an email or in a document file attached to the email is saved in the database. Then, in response to user authentication, the saved history information is displayed on a display apparatus.

Therefore, according to the configuration of the present embodiment, because history information regarding access to web pages is generated, useful information can be obtained by analyzing the history information regarding web pages. For example, statistical information regarding web access can be analyzed, and the result can be used in system designing or the like.

Embodiment 2

The present embodiment describes a configuration in which if a received email is determined to be an unsolicited email, processing is performed such that the source address of the email is saved in a database, and the transmission of email having the source address as the destination is suppressed or the like.

Figure 24:
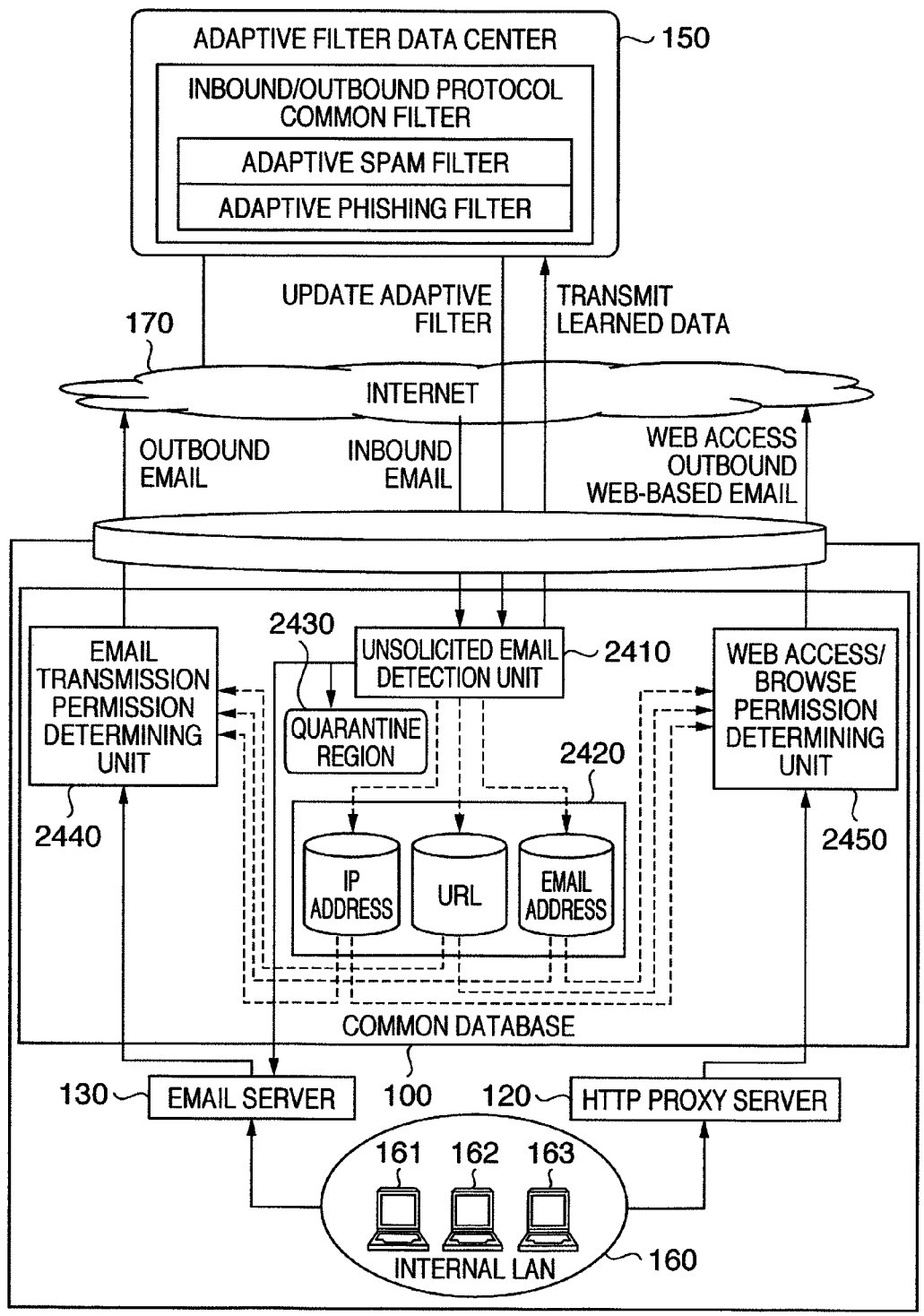
FIG. 24 is a block diagram used to illustrate the main functionality of the NMS.

FIG. 24 is a block diagram used to illustrate the main functionality of a network management system (NMS) 100 according to the present embodiment, describing the NMS 100 of FIG. 3 in detail.

In FIG. 24, reference numeral 2410 denotes an unsolicited email detection engine that determines whether or not each email transferred from the Internet 170 to the internal LAN 160 (inbound email) is an unsolicited email. If the email is determined to be an unsolicited email, the email address and URL included in the content are registered with the common database 2420, and the unsolicited email is transferred to the quarantine unit (quarantine region) 2430, where the email is quarantined.

Reference numeral 2440 denotes an email transmission permission determining unit. The email transmission permission determining unit 2440 determines whether or not to permit the transmission of an email transmitted from the internal LAN 160 to the external Internet 170 (outbound email) based on the data of the email. Specifically, an inquiry is made as to whether or not the email address and URL contained in the SMTP commands, email header, body, and file attached to the outbound email have been registered in the data of the common database 2420. If they have been registered, the transfer of the email is blocked.

Reference numeral 2450 denotes a web access/browse permission determining unit. The web access/browse permission determining unit 2450 determines whether or not to permit the transmission of web access data (access information) transmitted from the internal LAN 160 to the external Internet 170. Specifically, an inquiry is made as to whether or not the email address and URL contained in the destination address and destination URL, HTTP header, and entity body (body and attached file) of the web access data have been registered in the common database 2420. If they have been registered, the web access is blocked. Note that the data transferred as web access data includes web-based email as well.

Reference numeral 2430 denotes a quarantine module (quarantine region, quarantine unit) that stores the address of unsolicited emails and is used as filter information. Reference numeral 2420 denotes a common database that stores information such as the address of unsolicited emails and malicious URLs and is used as filter information. The common database 2420 corresponds to the DB 409 of FIG. 4.

Figure 12:
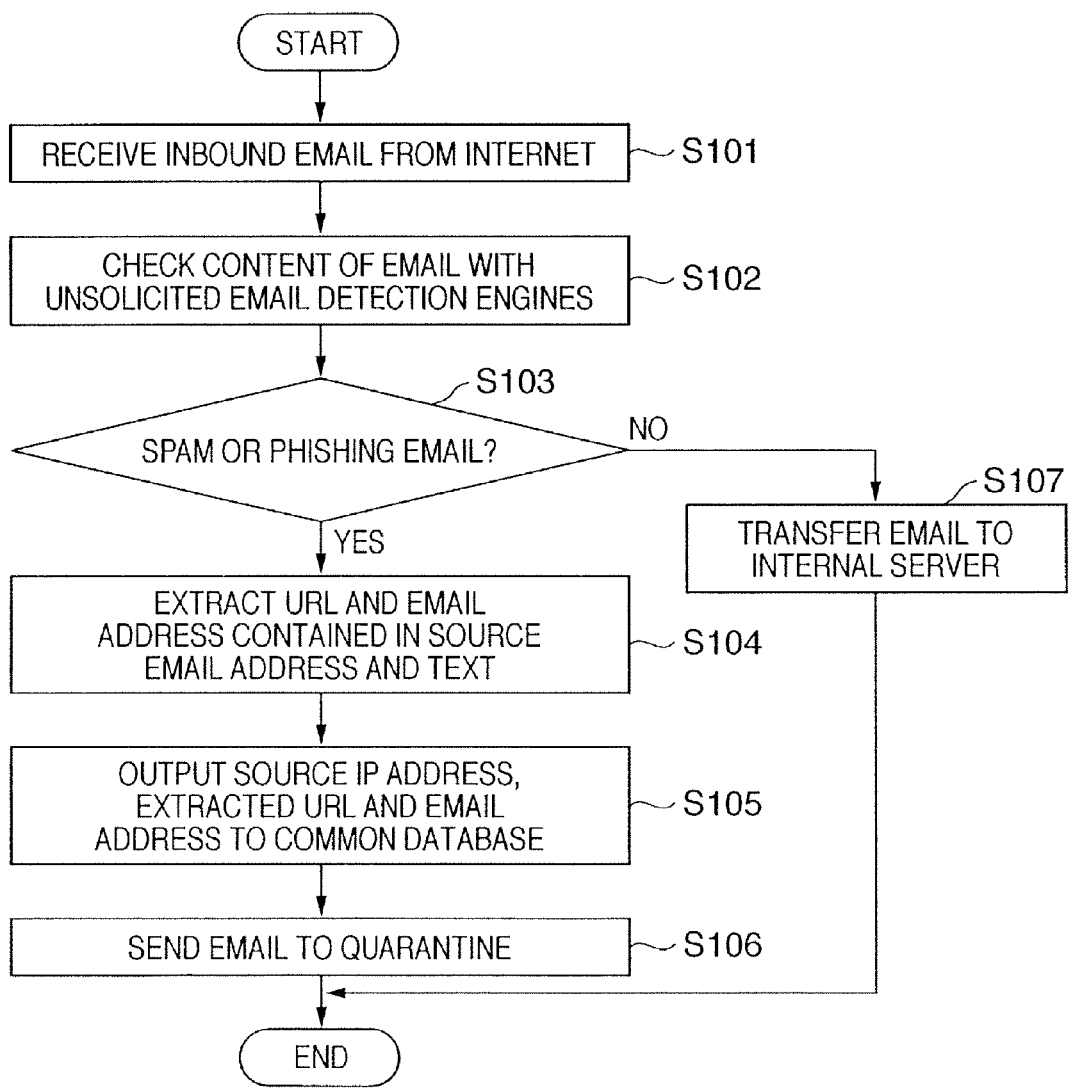
FIG. 12 is a flowchart illustrating a process executed by the NMS when receiving an inbound email.
Figure 13:
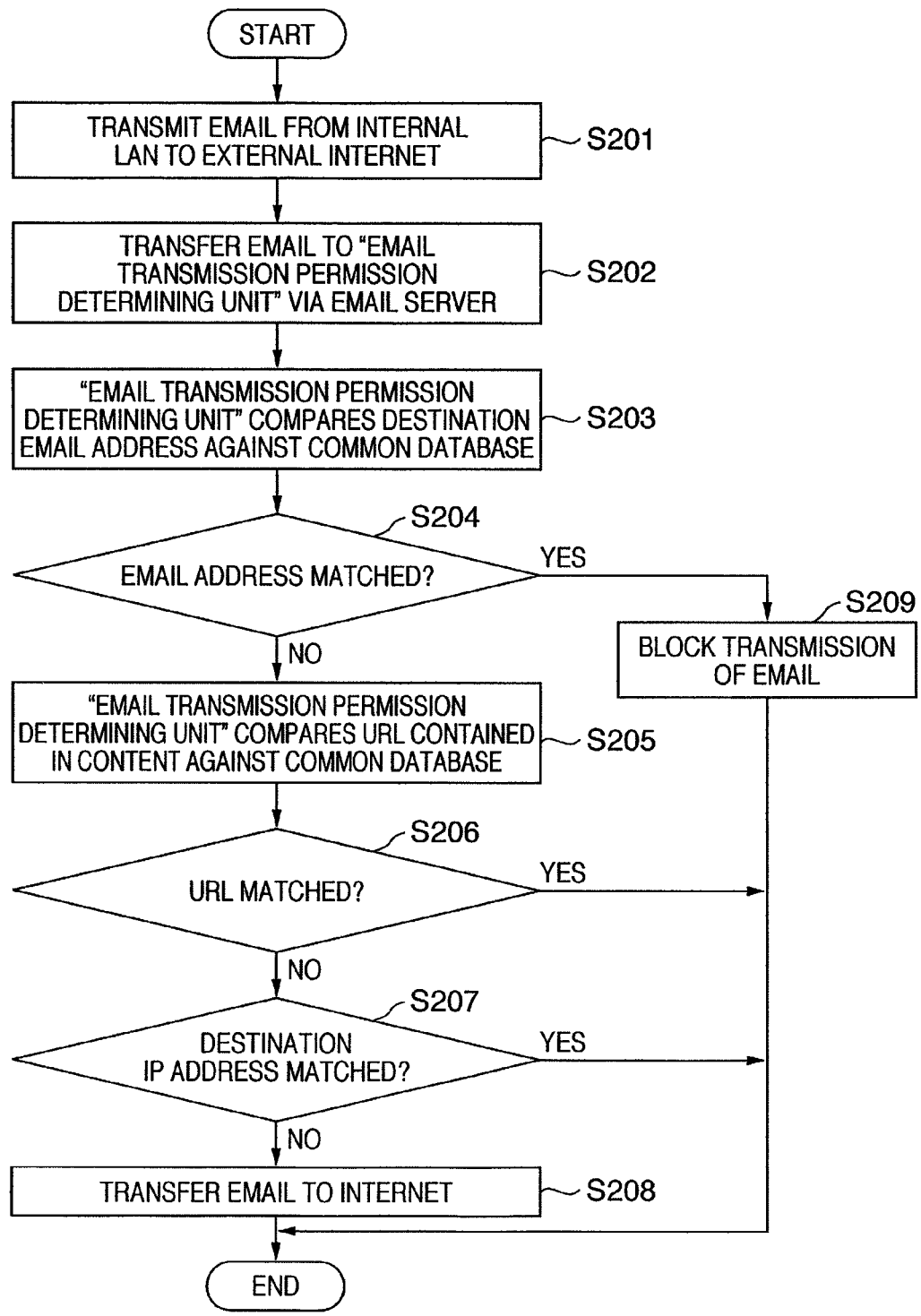
FIG. 13 is a flowchart illustrating a process executed to transmit an email from an internal LAN to the Internet.
Figure 14:
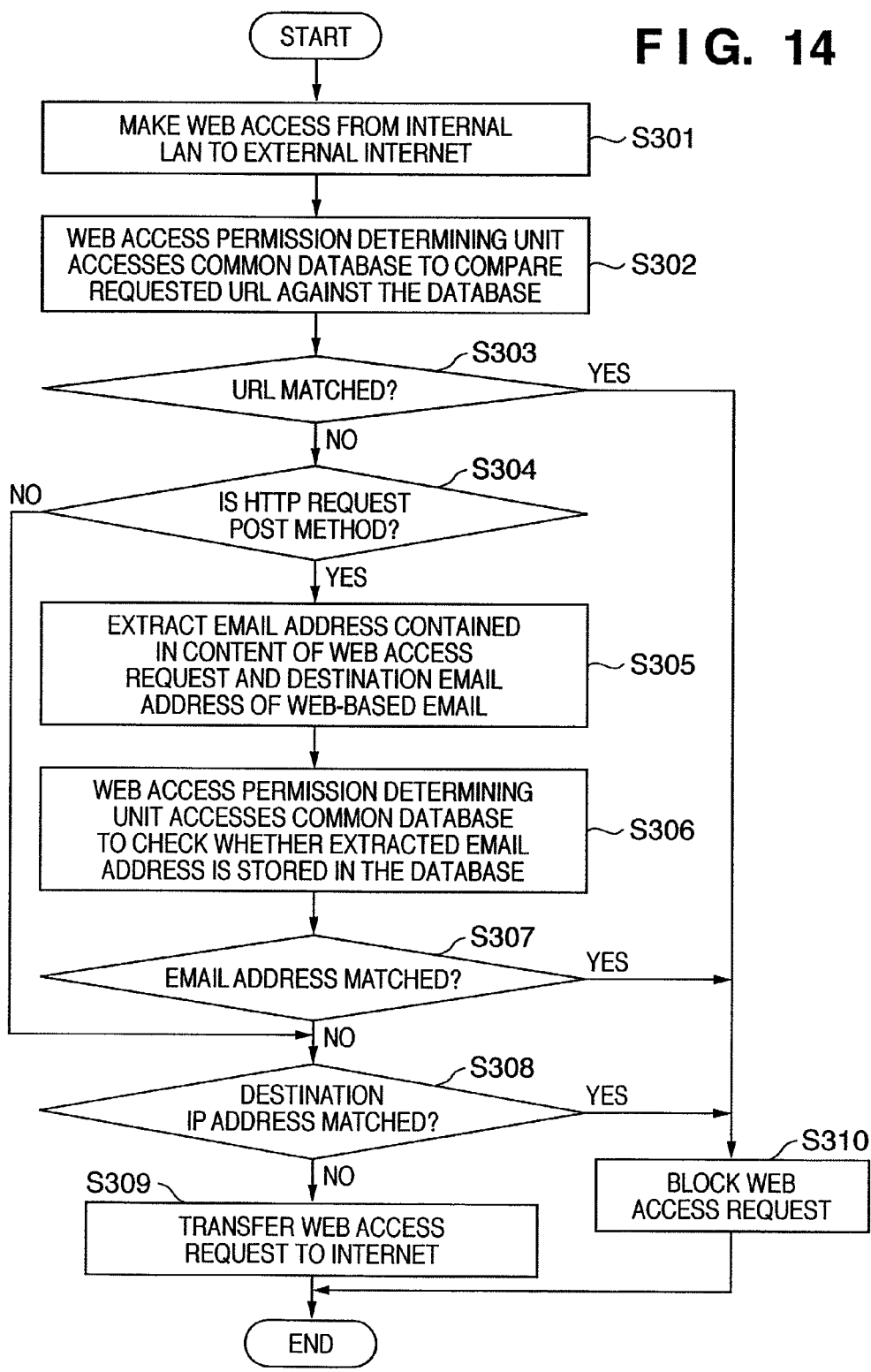
FIG. 14 is a flowchart illustrating a process executed when access is made from an internal LAN to a web page on the Internet.

The operation of the present embodiment as configured above shall be described according to the flowcharts of FIGS. 12 to 14. An operation performed when an email is received from an external source is described first with reference to FIG. 12. FIG. 12 is a flowchart illustrating a process executed by the NMS when receiving an inbound email.

First, in step S101, an inbound email is received from the Internet 170. Then, in step S102, the content of the email is checked by the spam detection engine 2410.

Next, in step S103, it is determined whether or not the received inbound email is an unsolicited email, such as spam or phishing email. If the email is determined to be an unsolicited email (YES in step S103), the process advances to step S104. If the email is determined to not be an unsolicited email (NO in step S103), the process advances to step S107.

In step S104, the URL and email address contained in the source email address, body, and file attached to the email are extracted. Next, in step S105, the extracted URL and email address are output to the common database 2420, where the URL and email address are stored as being malicious. In the next step, step S106, the email received in step S101 is quarantined in the quarantine module 2430. Then, the process ends.

On the other hand, in step S107, because the received inbound email is not an unsolicited email, the email is transferred to the internal email server 130. After having been transferred to the internal email server 130, the email is transferred to whichever of the information devices 161 to 163 that corresponds to the destination address. When the process of step S107 is finished, the NMS 100 ends the process illustrated in FIG. 12.

The operation for transmitting an email shall be described next with reference to FIG. 13. FIG. 13 is a flowchart illustrating a process executed to transmit an email from the internal LAN 160 to the Internet 170.

Firstly, in step S201, a terminal (e.g., one of the information devices 161 to 163) of the internal LAN 160 transmits an email (outbound email) to the Internet 170. Next, in step S202, the email is transferred to the email transmission permission determining unit 2440 of the NMS 100 through the email server 130.

Subsequently, in step S203, the email transmission permission determining unit 2440 compares the destination email address against the common database 2420. Next, in step S204, it is determined whether or not the destination email address of the outbound email matches any of the addresses registered in the common database 2420. If the email address matches any of the addresses registered in the common database 2420 (YES in step S204), the process advances to step S209. If it does not match (NO in step S204), the process advances to step S205.

In step S205, the email transmission permission determining unit (email transmission permission determining unit) 2440 compares the URL contained in the content (body and file attached to the email) against the common database 2420. Next, in step S206, it is determined whether or not the URL contained in the content matches any of the URLs registered in the common database 2420. If the URL matches any of the URLs registered in the common database 2420 (YES in step S206), the process advances to step S209. If it does not match (NO in step S206), the process advances to step S207.

In step S207, it is determined whether or not the IP address of an apparatus to which the received outbound email is to be transferred next matches any of the IP addresses registered in the common database 2420. If the IP address matches any of the IP addresses registered in the common database 2420 (YES in step S207), the process advances to step S209. If it does not match (NO in step S207), the process advances to step S208.

In step S208, the received outbound email is transferred based on the email address of the destination or the like. On the other hand, in step S209, transmission of the email is blocked, a warning is issued, or both of these are executed, and the transmission process is terminated. If the transmission of the email is blocked, it is preferable to transmit a log email indicating that the transmission has been blocked to the source of the email. It is also preferable to issue a warning by email.

Note that, in the above configuration, both the process of step S206 and that of step S207 are performed, but it is acceptable to perform only one of these processes instead.

The operation for browsing URLs shall be described with reference to FIG. 14. FIG. 14 is a flowchart illustrating a process executed when access is made from the internal LAN to a web page (website) on the Internet.

Firstly, in step S301, web access is made from the internal LAN 160 to the Internet 170. Specifically, the NMS 100 receives access information including a URL from one of the information devices 161 to 163 connected to the internal LAN 160. This access information is provided as an HTTP request.

Next, in step S302, the web access permission determining unit 2450 accesses the common database 2420 to compare the requested URL against the common database 2420. In the next step, step S303, the comparison result is checked to determine whether or not the requested URL matches any of the URLs registered in the common database 2420. If the requested URL matches any of the URLs registered in the common database 2420 (YES in step S303), the process advances to step S310. If it does not match (NO in step S303), the process advances to step S304.

In step S304, it is checked whether or not the HTTP request (access information) is the POST method. As used herein, the POST method is a method for sending web-based emails, uploading programs or data, or the like, through web access. If the request is the POST method (YES in step S304), the process advances to step S305. If the request does not use the POST method (NO in step S304), the process advances to step S308. Since the POST method is very likely to be used when transmitting web-based emails, when the POST method is used in the present embodiment, the process is executed assuming that a web-based email service is used. However, the method for determining whether or not a web-based email service is being used is not limited thereto, and it is also possible to, for example, detect the use of a predetermined web-based email application by analyzing the IP address of packets.

In step S305, the email address contained in the content of the web access request (access information) and the destination email address of the web-based email are extracted. Next, in step S306, the web access permission determining unit 2450 accesses the common database 2420 to check whether the extracted email address is stored as an inappropriate address in the database 2420. Next, in step S307, if the extracted email address is determined to be stored as an inappropriate address in the database 2420 (YES in step S307), the process advances to step S310. If the extracted email address is determined to not be stored (NO in step S307), the process advances to step S308.

In step S308, it is checked whether or not the destination IP address of the web access request (access information) is stored as an inappropriate IP address in the database 2420. If the destination IP address is determined to be stored as an inappropriate IP address in the database 2420 (YES in step S308), the process advances to step S310. If the destination IP address is determined to not be stored (NO in step S308) the process advances to step S309.

In step S309, the web access request is transferred to the Internet, and the process ends. On the other hand, in step S310, transmission of the web access is blocked, a warning is issued, or both of these are executed. Then, the transmission process ends. If the transmission of the web access is blocked, it is preferable to transmit an HTML page indicating that the transmission has been blocked to the source of the web access. It is also preferable to issue a warning by transmitting an HTML page.

Note that the process of S307 and that of step S308 have been performed above, but it is acceptable to perform only one of these processes instead.

Also, in the above configuration, email history and the like are saved and managed by the common database 2420 of the NMS 100, but a data saving unit of a PC that performs the operation of the management system 100 may be used as the data saving unit of the NMS. It is also possible that a client PC uses its saving unit to manage email history and web history, in other words, a client PC may self-manage email history and web history.

As described above, according to the configuration of the present embodiment, it is first determined whether or not a received email is an unsolicited email. If the email is determined to be an unsolicited email, the source address of the email is saved in the database. When transmitting an email, it is determined whether or not the destination address matches any of the saved addresses. If it is determined that it matches, transmission of the email is blocked, a warning is issued, or both of these are executed. Therefore, according to the configuration of the present embodiment, it is possible to suppress access to inappropriate sites and email transmission to spam senders to the highest degree possible.

Embodiment 3

Embodiments 1 and 2 have been described assuming that each functional element is implemented under the control of a program, but the present embodiment is described assuming that each functional element is implemented by hardware. The configuration according to the present embodiment is the same as that shown in FIG. 4.

The processes executed by the components of FIG. 4 are the same as those executed by the components of Embodiment 1. In other words, reference numeral 401 denotes an SMTP packet collecting/saving unit, 402 denotes an SMTP packet analyzing unit, 403 denotes an email transmission/reception history output unit, 404 denotes an HTTP packet collecting/saving unit, 405 denotes an HTTP/HTTPS packet analyzing unit, 406 denotes a web access history output unit. Reference numeral 408 denotes a web-based email transmission history output unit, 409 denotes a database output unit, 410 denotes a output module unit that detects and quarantines spam, virus-infected email and phishing email, and outputs email history, and the like. Reference numeral 411 denotes a quarantine unit that quarantines spam, virus-infected email and phishing email. Reference numeral 141 denotes a controller, which corresponds to the NIC1 shown in FIG. 1. Reference numeral 142 corresponds to the NIC2 shown in FIG. 1, and 143 corresponds to the NIC3 shown in FIG. 1.

In FIG. 4, packets are first captured. Then, it is determined whether the captured packets are HTTP or SMTP packets. If the captured packets are determined to be HTTP or SMTP packets, they are written in a save file. Then, it is determined whether or not an end instruction has been issued by the user. If an end instruction has been issued, the process ends.

In the analysis/output process, the temporary save file of the packet module is loaded first. After the packet loading is finished, the data for each TCP connection is decoded, and the order is checked and sorted. Next, the decoded data is analyzed to generate log data. The log is then output to the CSV file 407 or the database 409. Subsequently, it is determined whether or not to perform transmission. If it is determined that transmission is to be performed, the characteristics of the email are transmitted to the FDC 150 as normal email information. If all of the temporarily saved data has been processed, the process ends. If there is still data to be processed, the same process is repeated again.

The process of detecting spam, virus-infected email, phishing email and the like shall be described next. First, an email is received. Then, the email is checked by the detection engines. It is determined from the result of the check whether or not the email is an unsolicited email (spam, virus-infected email, phishing email, etc.). If the email is determined to be an unsolicited email, the whole of the email is quarantined, or history information (part of the log) such as the transmission/reception address and email title of the email is recorded in the quarantine email record of the database 409. Then, the email transmission/reception log is output to the database of the FDC 150, and the process ends. If the email is determined to be not an unsolicited email, the email is transferred to the email server 130, and the transmission/reception log is output to the database 409.

The received email is learned by the adaptive spam filter 380. Then, the learned result is transmitted to the database of the FDC 150, in which the result is learned (or registered). Subsequently, the data of the FDC 150 is downloaded and applied to the adaptive spam filter 380.

The handling of URL information (identification information of website) shall be described next. First, an inbound email sent to the user from an external source is received. Then, the content of the received email is checked by the detection engines to determine whether or not the received email is an unsolicited email. If the email is determined to be an unsolicited email, URL information is acquired from the content of the spam. The acquired URL information is transmitted to and registered (or learned) in the FDC 150.

As described above, similar to Embodiment 1, email history information and web access history information are displayed in response to user authentication in the present embodiment. Accordingly, the user can execute web browsing and management of email transmission/reception with an easy operation.

According to the configuration of at least one of Embodiments 1 to 3 described above, when accessing a web page via a network, the access transaction is saved in the database. Information for accessing a web page attached to the email sent via a network is also saved in the database. With this configuration, it is possible to restrict access to restricted web pages.

Also, when accessing a web page via a network, the access transaction is saved in the database, and at the same time, information for accessing a web page attached to the email sent via a network is saved in the database. Accordingly, it is possible to restrict access to restricted web pages.

Also, when accessing a web page via a network, the access transaction is saved in the database as history, and the order of the history saved in the database is checked. Accordingly, it is possible to provide an easy management of web page access.

Also, in a network management system in which an access transaction is saved in the database when accessing a web page via a network, if an email having information for accessing a web page via a network is sent, an inquiry is made as to whether or not to register the information for accessing the web page as information that enables access to a malicious web page. The result of the inquiry is reflected in the database. Accordingly, it is possible to confirm whether or not it is necessary to impose a restriction before imposing an access restriction on a web page, so that unnecessary restrictions can be eliminated.

Further, in a network management system that receives an email sent via a network after an email filter has determined whether or not to receive the email, it is determined whether or not to transmit the email via the email filter when transmitting the email via the network. Accordingly, it is possible to suppress the transmission of unnecessary emails.

Further, in a network management system that receives an email sent via a network after an email filter has determined whether or not to receive the email, information that enables access to a web page attached to a malicious email is sent to the filter to record it as filter information. Accordingly, it is possible to suppress the transmission of unnecessary emails.

Further, in a network management system that receives an email sent via a network after an email filter has determined whether or not to receive the email, a list of received emails is created, and the type of email is identified and reproduced. Accordingly, it is possible to alleviate the problem that the content of an email cannot be reproduced because the email is of a different type.

Further, in a network management system that receives an email sent via a network after an email filter has determined whether or not to receive the email, if it is determined not to receive the email and an email having information for accessing a web page via a network is sent, an inquiry is made as to whether or not to register the information as information that enables access to a malicious web page. The result of the inquiry is also reflected in the filter information. Accordingly, it is possible to further ease the operational burden of updating the database.

Other Embodiments

It is possible to employ a configuration in which the NMS 100 communicates a list of emails quarantined in the quarantine unit 411 (quarantine region 2430) to the system administrator. For example, a list of quarantined emails may be sent to the email address of the system administrator by email. FIG. 15 a diagram of an exemplary email that shows a list of quarantined emails.

It is possible to employ a configuration in which the NMS 100 generates a web screen displaying a list of emails quarantined in the quarantine unit 411 (quarantine region 2430), and displays the screen on a display apparatus in response to an instruction from the system administrator. FIG. 16 is a diagram of an exemplary web screen displaying a list of quarantined emails. In FIG. 16, reference numeral 1301 denotes a normal email report button that determines that the current email is normal (i.e., not an unsolicited email) in response to the selection of the button 1301. With this button 1301, even if the NMS 100 determines a normal email to be an unsolicited email, the system administrator can correct the incorrect determination that the normal email is an unsolicited email.

It is possible to employ a configuration in which in the exemplary web screen of FIG. 16, in response to selection of an icon or the like that indicates an unsolicited email, a web screen that shows the body of the unsolicited email is generated, and displayed on a display apparatus. FIGS. 17 and 18 are diagrams of exemplary web screens showing the content of unsolicited emails.

FIG. 23 is a diagram of an exemplary web screen on which settings for monitoring unsolicited email are entered. After a user has logged in from the exemplary login screen of FIG. 19, the NMS 100 switches to a display of the screens of FIGS. 16 to 18, FIGS. 20 to 23, and the like according to an instruction of the system administrator. Accordingly, unless the user logs out after he/she has been authenticated, the user can work while changing applications without having to perform another authentication. This allows for easy operation for the user.

The amount of web pages and spam is enormous, and the web environment and the types of spam that need to be eliminated are changing/growing day by day. Under these circumstances, a management/setting procedure for updating the filter information to be optimal for each situation is usually complicated. Also, when regulating the transmission/reception of inappropriate email, it is necessary to update the conditions for the email to be regulated, but the management/setting procedure therefor is usually complicated. Further, when controlling access to web pages, email delivery, and the like, it is useful to analyze the actual utilization status of the system to be controlled and reflect it in the filter information, but this analysis procedure is also usually complicated. In view of the foregoing, a configuration in which access control to a web page and control of email transmission/reception can be performed properly by automatically managing/setting an appropriate filtering policy (filter information) shall be described in the present embodiment.

Similar to Embodiments 1 and 2, the configuration according to the present embodiment can also be illustrated using FIGS. 1 to 4, FIG. 24, and so on. An NMS 100 according to the present embodiment connects an internal network (internal LAN 160) and an external network (the Internet 170), and controls the data transfer between these networks. Further, the NMS 100 stores filter information for determining an unsolicited email.

If the NMS 100 receives an email (inbound email) addressed to a terminal located on the internal LAN 160 from the Internet 170, the NMS 100 determines whether or not the email is an unsolicited email based on the filter information. If the email is determined to be an unsolicited email, the NMS 100 performs control so that the email is not transferred to the internal LAN 160.

The NMS 100 also stores address information of emails and identification information (URL, IP address, etc.) of server apparatuses that provide web pages in a storage apparatus such as a hard disk drive.

If the NMS 100 receives request information (access information) requiring an access to a server apparatus located on the Internet 170 from the internal LAN 160, the NMS 100 determines whether or not to permit an access to the server apparatus based on the identification information stored in the storage apparatus. If the NMS 100 determines to not permit the access required by the received request information, the NMS 100 performs control so that the request information is not transferred to the external network.

If the NMS 100 receives an email (outbound email) addressed to a terminal located on the Internet 170 from the internal LAN 160, it determines whether or not to permit the transfer of the email based on the address information stored in the storage apparatus. If the NMS 100 determines to not permit the transfer of the received email, it performs control so that the email is not transferred to the external network.

Further, the NMS 100 analyzes the inbound email determined to be an unsolicited email, and updates the content stored in the storage apparatus based on at least one of the email address information and the identification information of the server apparatus which are written in the email.

As described above, according to this configuration, if an inbound email is determined to be an unsolicited email, the email address information and the identification information of the server apparatus stored in the storage apparatus are updated automatically. Therefore, according to this configuration, access control to a web page and control of email transmission/reception can be performed properly, without requiring human labor, by automatically managing/setting appropriate filtering information (e-email address information, server apparatus identification information, etc.).

Also, if the NMS 100 receives the POST method containing email address information that is transmitted from the internal LAN 160 to a server apparatus located on the Internet 170, the NMS 100 determines whether or not to permit the transfer of the POST method based on the address information stored in the storage apparatus. If the NMS 100 determines to not accept the transfer of the received POST method, it performs control so that the POST method is not transferred to the Internet 170.

Accordingly, the NMS 100 can prohibit the input of an unsolicited email address in the web-based email system.

Also, if the NMS 100 receives an email containing the identification information of a server apparatus that is transmitted from the internal LAN 160 to a terminal located on the Internet 170, the NMS 100 determines whether or not to permit the transfer of the email based on the identification information stored in the storage apparatus. If the NMS 100 determines not to permit the transfer of the received email, it performs control so that the email is not transferred to the Internet 170.

Accordingly, the NMS 100 can prohibit the transmission of an email if the email to be transmitted contains a URL or IP address of a prohibited website.

The NMS 100 also records the history information of the data transmitted/received by the network management system 100. In response to a request from an information processing apparatus located on the internal LAN 160 or the Internet 170, the NMS 100 generates a view screen based on the history information, and transmits the screen to the information processing apparatus.

Accordingly, the information processing apparatus capable of communicating with the NMS 100 can display the screen displaying the history information, so that the user of the information processing apparatus can view the screen displaying the history information.

The NMS 100 also receives updated filter information from the FDC 150 that manages filter information for determining an unsolicited email, and updates the filter information of the NMS 100 based on the updated filter information. Accordingly, the filter information of the NMS 100 can be kept up to date.

Also, the NMS 100 learns whether or not an email is unsolicited email, updates the stored filter information based on the learned result, and transmits the updated filter information to the FDC 150. Accordingly, the filter information of the FDC 150 also can be kept up to date based on the information transmitted from the NMS 100.

Also, the NMS 100 quarantines inbound emails determined to be an unsolicited email in a quarantine region such as a predetermined hard disk drive. Accordingly, the NMS 100 can analyze the inbound emails quarantined in a quarantine region. For example, information for updating the filter can be acquired.

Note that the NMS 100 updates the content stored in the storage apparatus based on the description of at least either of the source field and the body of the email determined to be an unsolicited email. Also note that the NMS 100, the HTTP proxy server 120, and the SPS server 130 can also be configured of the same PC, WS or single hardware information processing apparatus.

Although an embodiment of the present invention has been described in detail above, it is possible for the invention to take on the form of a system, apparatus, program or storage medium. More specifically, the present invention may be applied to a system comprising a plurality of devices or to an apparatus comprising a single device.

It should be noted that there are cases where the object of the invention is attained also by supplying a program, which implements the functions of the foregoing embodiments, directly or remotely to a system or apparatus, reading the supplied program codes with a computer of the system or apparatus, and then executing the program codes.

Accordingly, since the functions of the present invention are implemented by computer, the program codes per se installed in the computer also fall within the technical scope of the present invention. In other words, the present invention also covers the computer program itself that is for the purpose of implementing the functions of the present invention.

In this case, so long as the system or apparatus has the functions of the program, the form of the program, for example, object code, a program executed by an interpreter or script data supplied to an operating system, etc., does not matter.

Examples of storage media that can be used for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and the computer program per se of the present invention or a compressed file that contains an automatic installation function can be downloaded to a recording medium such as a hard disk. Further, the program of the present invention can be supplied by dividing the program code constituting the program into a plurality of files and downloading the files from different websites. In other words, a WWW server that downloads, to multiple users, the program files that implement the functions of the present invention by computer also is covered by the present invention.

Further, it is also possible to encrypt and store the program of the present invention on a storage medium such as a CD-ROM, distribute the storage medium to users, allow users who meet certain requirements to download decryption key information from a website via the Internet, and allow these users to run the encrypted program by using the key information, whereby the program is installed in the user computer. Further, besides the case where the aforesaid functions according to the embodiment are implemented by executing the read program by computer, an operating system or the like running on the computer may perform all or a part of the actual processing so that the functions of the foregoing embodiment can be implemented by this processing.

Furthermore, after the program read from the storage medium is written to a memory provided in a function expansion board inserted into the computer or a function expansion unit connected to the computer, a CPU or the like mounted on the function expansion board or function expansion unit performs all or a part of the actual processing so that the functions of the foregoing embodiment can be implemented by this processing.

As described above, according to the present invention, it is possible to provide a technique that allows an easy operation for controlling web browsing and email transmission/reception.

Further, according to the present invention, it is possible to provide a technique that can collectively perform website access management and management of email transmission/reception.

Further, according to the present invention, it is possible to provide a technique by which the history of access to inappropriate sites and the history of receiving spam can be easily monitored.

Further, according to the present invention, it is possible to provide a technique that can suppress access to inappropriate sites and email transmission to spam senders to the highest degree possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-093316, filed Mar. 30, 2007, which is hereby incorporated by reference herein in its entirety.

What is claimed is:

1. A network management system comprising at least a processing unit and memory serving as:
 a first transmitting/receiving unit adapted to transmit/receive an email via a network;
 a first saving unit adapted to save, in a database, first history information including the address of at least one of the destination and the source of the email written in the email;
 a second saving unit adapted to save, in the database, second history information including first URL information retrieved from the email, wherein the first URL information is not retrieved from an address of the destination or the source of the email;
 a second transmitting/receiving unit adapted to transmit/receive a request to access a web page, the request including second URL information associated with the web page;
 a third saving unit adapted to save, in the database, third history information including the second URL information;
 a first analyzing unit adapted to analyze whether the email is an unsolicited email based at least in part on the second history information; and
 a display control unit adapted to selectively display, on a display unit, the first history information, the second history information, and the third history information stored in the database.

2. The network management system according to claim 1, wherein the display control unit displays the first history information and the second history information in time-series on the display unit.

3. The network management system according to claim 2, wherein the display control unit changes the display order of the first history information and the second history information in response to an instruction inputted by a user.

4. The network management system according to claim 1, wherein the database saves the first history information and the second history information in CSV format.

5. The network management system according to claim 1, wherein the first history information includes the address of at least one of the destination and the source of an unsolicited email written in the unsolicited email.

6. A network management system comprising at least a processing unit and memory serving as:
 a receiving unit adapted to receive an email sent via a network;
 a sending unit adapted to send an email via the network;
 a first determining unit adapted to determine whether or not the received email is an unsolicited email;
 an extracting unit adapted to extract URL information for accessing a web page when the first determining unit determines the email to be an unsolicited email; and
 a saving unit adapted to save, in a database, the URL information extracted by the extracting unit
 wherein the sending unit is further adapted to determine whether URL information included in a body of an email or a document attached to an email is the same as the URL information stored in the saving unit when the email is sent, and to issue a warning or to block transmission of the email if it is determined that the URL information included in the body of the email or the document attached to the email is the same as the URL information stored in the saving unit.

7. The network management system according to claim 6, further comprising:
 a transmitting unit adapted to transmit an email via a network;
 a second determining unit adapted to determine whether or not a destination address is identical to address information saved by the saving unit when transmitting the email; and
 a control unit adapted to either block transmission of the email, issue a warning, or execute both when the second determining unit determines the destination address is identical to the saved address information.

8. The network management system according to claim 6, wherein the database further stores filter information for determining an unsolicited email, and
 the first determining unit determines whether or not the email is an unsolicited email based on the filter information.

9. The network management system according to claim 8, wherein the database further stores URL information to a malicious web page, and the first determining unit determines the received email to be an unsolicited email when the email contains the URL information stored in the database.

10. The network management system according to claim 8, further comprising:
a filter information receiving unit adapted to receive filter information from an external data center apparatus; and
an updating unit adapted to update the filter information stored in the database based on the filter information received by the filter information receiving unit.

11. The network management system according to claim 10, further comprising:
a filter information transmitting unit adapted to transmit the filter information stored in the database to the data center apparatus.

12. The network management system according to claim 7, further comprising:
a third determining unit adapted to determine whether or not URL information contained in request information that requests access to a server apparatus located on an external network is identical to the access information saved by the saving unit when transmitting the request information,
wherein the control unit either blocks transmission of the request information, issues a warning, or executes both when the third determining unit determines the URL information to be identical to the saved URL information.

13. The network management system according to claim 7, further comprising:
a fourth determining unit adapted to determine, when transmitting transmission information including email address information by the POST method, whether or not the email address information is identical to the address information saved by the saving unit,
wherein the control unit either blocks transmission of the transmission information, issues a warning, or executes both.

14. A network management method in a network management system comprising:
a first transmitting/receiving step of transmitting/receiving an email via a network;
a first saving step of saving, in a database, first history information including the address of at least one of the destination and the source of the email written in the email;
a second saving step of saving, in the database, second history information including first URL information retrieved from the email, wherein the first URL information is not retrieved from an address of the destination or the source of the email;
a second transmitting/receiving step of transmitting/receiving a request to access a web page, the request including second URL information associated with the web page;
a third saving step of saving, in the database, third history information including the second URL information;
a first analyzing step of analyzing whether the email is an unsolicited email based at least in part on the second history information; and
a display control step of selectively displaying the first history information, the second history information, and the third history information stored in the database.

15. A network management method in a network management system comprising:
a receiving step of receiving an email sent via a network;
a sending step of sending an email via a network;
a first determining step of determining whether or not the received email is an unsolicited email;
an extracting step of extracting URL information for accessing a web page when the email is determined to be an unsolicited email in the first determining step; and
a saving step of saving, in a database, the URL information extracted in the extracting step,
wherein the sending step includes determining whether URL information included in a body of an email or a document attached to an email is the same as the URL information stored in the saving step when the email is sent, and issuing a warning or to block transmission of the email if it is determined that the URL information included in the body of the email or the document attached to the email is the same as the URL information stored in the saving step.

16. A non-transitory computer-readable recording medium storing a program for causing a computer to execute:
a first transmitting/receiving step of transmitting/receiving an email via a network;
a first saving step of saving, in a database, first history information including the address of at least one of the destination and the source of the email written in the email;
a second saving step of saving, in the database, second history information including first URL information retrieved from the email, wherein the first URL information is not retrieved from an address of the destination or the source of the email;
a second transmitting/receiving step of transmitting/receiving a request to access a web page, the request including second URL information associated with the web page;
a third saving step of saving, in the database, third history information including the second URL information;
a first analyzing step of analyzing whether the email is an unsolicited email based at least in part on the second history information; and
a display control step of selectively displaying the first history information, the second history information, and the third history information stored in the database.

17. A non-transitory computer-readable recording medium storing a program for causing a computer to execute:
a receiving step of receiving an email sent via a network;
a sending step of sending an email via a network;
a first determining step of determining whether or not the received email is an unsolicited email;
an extracting step of extracting URL information for accessing a web page when the email is determined to be an unsolicited email in the first determining step; and
a saving step of saving, in a database, the URL information extracted in the extracting step,
wherein the sending step includes determining whether URL information included in a body of an email or a document attached to an email is the same as the URL information stored in the saving step when the email is sent, and issuing a warning or to block transmission of the email if it is determined that the URL information included in the body of the email or the document attached to the email is the same as the URL information stored in the saving step.

* * * * *